US009274014B2

(12) United States Patent
Janik et al.

(10) Patent No.: US 9,274,014 B2
(45) Date of Patent: Mar. 1, 2016

(54) SENSOR ASSEMBLY AND METHOD FOR MEASURING FORCES AND TORQUES

(71) Applicant: Stryker Corporation, Kalamazoo, MI (US)

(72) Inventors: John J. Janik, Hudsonville, MI (US); Robert A. Brindley, Delton, MI (US); Edward Tang, Ann Arbor, MI (US); Leland J. Spangler, Manitou Springs, CO (US)

(73) Assignee: STRYKER CORPORATION, Kalamazoo, MI (US)

( * ) Notice: Subject to any disclaimer, the term of this patent is extended or adjusted under 35 U.S.C. 154(b) by 37 days.

(21) Appl. No.: 14/199,299

(22) Filed: Mar. 6, 2014

(65) Prior Publication Data
US 2014/0260676 A1    Sep. 18, 2014

Related U.S. Application Data

(60) Provisional application No. 61/777,596, filed on Mar. 12, 2013.

(51) Int. Cl.
*G01L 5/16* (2006.01)
*G01L 3/08* (2006.01)
(Continued)

(52) U.S. Cl.
CPC ... *G01L 5/16* (2013.01); *G01L 1/04* (2013.01); *G01L 3/08* (2013.01); *G01L 3/1421* (2013.01); *G01L 5/226* (2013.01)

(58) Field of Classification Search
CPC ........... G01L 5/16; G01L 3/08; G01L 3/1421; G01L 1/04; G01L 5/226
USPC .................. 73/862.41, 1.08, 1.09, 1.54, 1.55, 73/862.42, 862.391, 862.451, 862.471
See application file for complete search history.

(56) References Cited

U.S. PATENT DOCUMENTS 4,121,049 A  10/1978  Roeber
4,577,513 A   3/1986  Harwood et al.
(Continued)

FOREIGN PATENT DOCUMENTS

CN    102435362 A    5/2012
WO  WO 92 03769 A1   3/1992
(Continued)

OTHER PUBLICATIONS

Weihai Chen, Jun Jiang, Wenjie Chen and Jingmeng Liu, A novel flexure-based uniaxial force sensor with large range and high resolution, Science China Technological Sciences, Aug. 1, 2013, vol. 56, Issue 8, pp. 1940-1948, doi: 10.1007/s11431-013-5240-3, Science China Press and Springer-Verlag Berlin Heidelberg; 9 pages.
(Continued)

*Primary Examiner* — Lisa Caputo
*Assistant Examiner* — Philip Cotey
(74) *Attorney, Agent, or Firm* — Howard & Howard Attorneys PLLC

(57) ABSTRACT

A sensor assembly comprises a base plate and a sensor member displaceable relative to the base plate. A spring arrangement operates in first and second stages in response to displacement of the sensor member relative to the base plate. Different resolutions of force and torque measurements are associated with the first and second stages. A light sensitive transducer senses displacement of the sensor member relative to the base plate and generates corresponding output signals. A collimator directs a plurality of light beams onto the light sensitive transducer so that the light beams strike different pixels of the light sensitive transducer to sense displacement of the sensor member relative to the base plate.

19 Claims, 24 Drawing Sheets

(51) Int. Cl.
  *G01L 5/22* (2006.01)
  *G01L 1/04* (2006.01)
  *G01L 3/14* (2006.01)

(56) References Cited

U.S. PATENT DOCUMENTS

| | | | |
|---|---|---|---|
| 4,906,907 A | 3/1990 | Tsuchihashi et al. | |
| 5,033,314 A | 7/1991 | Dralsey | |
| 5,056,038 A | 10/1991 | Kuno et al. | |
| 5,090,131 A | 2/1992 | Deer | |
| 5,129,265 A * | 7/1992 | Bartels et al. | 73/862.044 |
| 5,130,632 A | 7/1992 | Ezawa et al. | |
| 5,223,776 A | 6/1993 | Radke et al. | |
| 5,295,399 A | 3/1994 | Grant et al. | |
| 5,402,684 A | 4/1995 | Engeler et al. | |
| 5,452,615 A | 9/1995 | Hilton | |
| 5,526,700 A | 6/1996 | Akeel | |
| 5,581,166 A | 12/1996 | Eismann et al. | |
| 5,606,137 A | 2/1997 | Penketh | |
| 5,648,617 A | 7/1997 | Cullen et al. | |
| 5,648,708 A | 7/1997 | Littlejohn | |
| 5,706,027 A | 1/1998 | Hilton et al. | |
| 5,767,648 A | 6/1998 | Morel et al. | |
| 5,798,748 A | 8/1998 | Hilton et al. | |
| 5,828,813 A | 10/1998 | Ohm | |
| 5,872,320 A | 2/1999 | Kamentser et al. | |
| 5,956,140 A | 9/1999 | Ishizuka et al. | |
| 6,236,906 B1 | 5/2001 | Müller | |
| 6,550,346 B2 | 4/2003 | Gombert et al. | |
| 6,583,783 B1 | 6/2003 | Dietrich et al. | |
| 6,694,828 B1 | 2/2004 | Nicot | |
| 6,753,519 B2 | 6/2004 | Gombert | |
| 6,792,815 B2 | 9/2004 | McDearmon et al. | |
| 6,804,012 B2 | 10/2004 | Gombert | |
| 6,868,746 B1 | 3/2005 | Peshkin et al. | |
| 6,891,526 B2 | 5/2005 | Gombert et al. | |
| 6,915,709 B2 | 7/2005 | Okada | |
| 6,928,886 B2 | 8/2005 | Meusel et al. | |
| 7,057,154 B2 | 6/2006 | Kitamura et al. | |
| 7,114,398 B2 | 10/2006 | Haines | |
| 7,121,147 B2 | 10/2006 | Okada | |
| 7,122,818 B2 | 10/2006 | Kitamura et al. | |
| 7,155,316 B2 | 12/2006 | Sutherland et al. | |
| 7,181,314 B2 | 2/2007 | Zhang et al. | |
| 7,208,714 B2 | 4/2007 | Kitamura et al. | |
| 7,219,564 B1 | 5/2007 | May | |
| 7,220,958 B2 | 5/2007 | Kitamura et al. | |
| 7,289,228 B2 | 10/2007 | Kitamura et al. | |
| 7,296,463 B2 * | 11/2007 | Gombert | 73/161 |
| 7,302,350 B2 | 11/2007 | Gombert et al. | |
| 7,312,615 B2 | 12/2007 | Perry | |
| 7,360,456 B2 | 4/2008 | Morimoto | |
| 7,460,964 B2 | 12/2008 | Mizota et al. | |
| 7,493,836 B2 | 2/2009 | Wolfer et al. | |
| 7,603,917 B2 | 10/2009 | Graham et al. | |
| 7,707,893 B2 | 5/2010 | Johansson | |
| 7,752,920 B2 | 7/2010 | Blumenkranz et al. | |
| 7,779,705 B2 | 8/2010 | Mastinu et al. | |
| 7,988,215 B2 | 8/2011 | Seibold | |
| 8,048,088 B2 | 11/2011 | Green et al. | |
| 8,063,883 B2 | 11/2011 | Senft et al. | |
| 8,196,477 B2 | 6/2012 | Ohsato et al. | |
| 8,209,137 B2 | 6/2012 | Doleschel et al. | |
| 8,220,343 B2 | 7/2012 | Hatanaka et al. | |
| 8,281,670 B2 | 10/2012 | Larkin et al. | |
| 8,375,808 B2 | 2/2013 | Blumenkranz et al. | |
| 8,462,358 B2 | 6/2013 | Becker et al. | |
| 2003/0102422 A1 | 6/2003 | Gombert | |
| 2003/0150283 A1* | 8/2003 | Stanley et al. | 73/862.391 |
| 2004/0070308 A1* | 4/2004 | Novack | 310/309 |
| 2005/0172711 A1* | 8/2005 | Gombert | 73/161 |
| 2006/0048364 A1 | 3/2006 | Zhang et al. | |
| 2006/0178775 A1 | 8/2006 | Zhang et al. | |
| 2007/0034023 A1* | 2/2007 | Browning | 73/862.638 |
| 2007/0151390 A1 | 7/2007 | Blumenkranz et al. | |
| 2007/0273946 A1* | 11/2007 | Kato et al. | 359/199 |
| 2008/0022784 A1* | 1/2008 | Wehinger et al. | 73/862.621 |
| 2008/0276725 A1 | 11/2008 | Pusch | |
| 2009/0024142 A1 | 1/2009 | Ruiz Morales | |
| 2009/0248038 A1 | 10/2009 | Blumenkranz et al. | |
| 2010/0094312 A1 | 4/2010 | Ruiz Morales et al. | |
| 2010/0164873 A1* | 7/2010 | Senft et al. | 345/170 |
| 2011/0046637 A1 | 2/2011 | Patel et al. | |
| 2011/0276059 A1 | 11/2011 | Nowlin et al. | |
| 2011/0314935 A1 | 12/2011 | Krippner et al. | |
| 2012/0029286 A1 | 2/2012 | Sarvazyan et al. | |
| 2012/0136480 A1 | 5/2012 | Lee et al. | |
| 2012/0250031 A1* | 10/2012 | Ikeda et al. | 356/499 |
| 2012/0266694 A1 | 10/2012 | Szasz et al. | |
| 2013/0086995 A1* | 4/2013 | Yao et al. | 73/862.08 |
| 2014/0039681 A1 | 2/2014 | Bowling et al. | |
| 2014/0123764 A1* | 5/2014 | Abtahi et al. | 73/705 |

FOREIGN PATENT DOCUMENTS

| | | |
|---|---|---|
| WO | WO 96 39798 A2 | 12/1996 |
| WO | WO 2008 712512 A2 | 6/2008 |
| WO | WO 2009 123891 A1 | 10/2009 |
| WO | WO 2012 084069 A1 | 6/2012 |
| WO | WO 2012 153643 A1 | 11/2012 |

OTHER PUBLICATIONS

Machine-Assisted English language translation for CN 102435362 A extracted from www.espacenet.com on May 9, 2014; 35 pages.

English language abstract for WO 2008 0712512 A2 extracted from www.espacenet.com on May 15, 2014; 23 pages.

\* cited by examiner

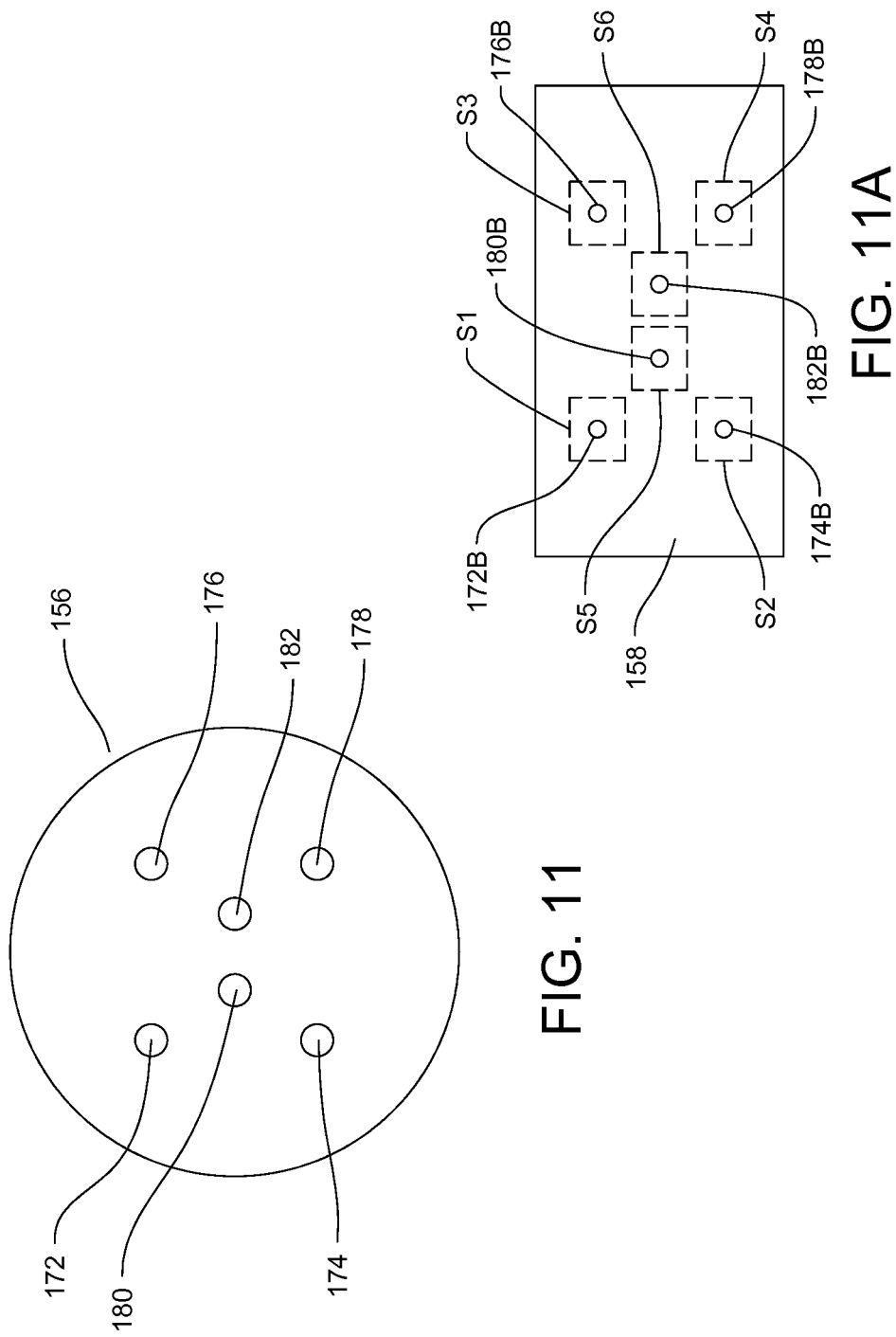

SENSOR ASSEMBLY AND METHOD FOR MEASURING FORCES AND TORQUES

RELATED APPLICATIONS

This application claims priority to and the benefit of U.S. Provisional Patent Application No. 61/777,596, filed on Mar. 12, 2013, the entire contents of which are hereby incorporated by reference.

TECHNICAL FIELD

The disclosure relates generally to a force/torque sensor assembly and a method for measuring forces and torques. In some embodiments, the force/torque sensor assembly and method are employed in a robotic system comprising an instrument and a manipulator used to position the instrument.

BACKGROUND

Medical practitioners have found it useful to use robotic systems to assist in the performance of surgical procedures. Such robotic systems typically include a manipulator having a moveable arm comprising one or more links. A surgical instrument is attached to a free end of the arm. The instrument is designed to be applied to a surgical site. A controller regulates movement of the arm to position the instrument with a high degree of accuracy at the surgical site.

A component of many robotic systems is a force/torque sensor assembly. The force/torque sensor assembly is attached between the free end of the arm and the instrument. The force/torque sensor assembly monitors forces and torques that are applied to the instrument. These may be forces and torques that are applied to the instrument as a consequence of the instrument pressing against tissue. These also may be forces and torques a practitioner applies in order to set a position and/or orientation of the instrument. Signals output by the force/torque sensor assembly are received by the controller. The controller uses these signals to determine a target position for the instrument. Based on the determined target position, the controller actuates the arm in order to advance the arm so that the instrument is moved to the target position.

In order to ensure all forces and torques applied to the instrument are measured, it is common practice to provide a six component force/torque sensor assembly. This type of force/torque sensor assembly measures forces applied to the instrument along three axes and torques applied to the instrument around the three axes.

One type of six component force/torque sensor assembly comprises a set of strain gauges. These gauges include a static member to which a plurality of beams are flexibly mounted. Typically one or more strain gauges are associated with each beam. Each strain gauge acts as a transducer that is used to convert a force or torque into an electrical signal. Each strain gauge generates an electrical signal proportional to the flexure of the beam with which the strain gauge is associated. The output signals from the strain gauges are input variables into an algorithm that yields the measured forces and torques.

In force/torque sensor assemblies employing strain gauges, thermal drift is a common problem. Thermal drift occurs when a change in temperature causes a contraction or expansion of parts. Thermal drift can result in inaccurate placement of the instrument at the surgical site. It is also common for these types of force/torque sensor assemblies to take force and torque measurements at a single resolution. In some cases it may be desirable for the force/torque sensor assembly to be capable of measuring forces and torques at multiple resolutions.

Thus, there is a need in the art for a force/torque sensor assembly and method of measuring forces and torques that overcomes one or more of these deficiencies.

SUMMARY

In one embodiment a sensor assembly is provided. The sensor assembly comprises a base plate and a sensor member displaceable relative to the base plate. A spring arrangement operates in first and second stages in response to displacement of the sensor member relative to the base plate. Different resolutions of force and torque measurements are associated with the first and second stages. A light sensitive transducer senses displacement of the sensor member relative to the base plate and generates corresponding output signals.

In another embodiment a sensor assembly is provided that comprises a light sensitive transducer having a plurality of pixels. A light source provides light to be directed in a plurality of light beams onto the light sensitive transducer so that the light beams strike different pixels of the light sensitive transducer to sense displacement of a sensor member relative to a base plate.

In yet another embodiment, a method is provided for assessing forces and torques using a sensor including a light sensitive transducer having a plurality of pixels. The method comprises operating the sensor to direct a plurality of light beams onto the light sensitive transducer. A load is applied on the sensor so that each of the plurality of light beams move on the light sensitive transducer. Forces and torques are determined based on differences in locations of pixels lighted by the light beams as the light beams move in response to the applied load.

Robotic systems and methods employing these sensor assemblies and methods for assessing forces and torques are also provided.

One advantage of these sensor assemblies and methods is that the sensor assemblies are capable of determining forces and torques at different resolutions for certain applications. Another advantage is that the sensor assemblies operate optically to avoid potential thermal drift issues associated with strain gauges.

BRIEF DESCRIPTION OF THE DRAWINGS

Advantages of the present invention will be readily appreciated as the same becomes better understood by reference to the following detailed description when considered in connection with the accompanying drawings wherein:

FIG. 11 is a plan view of a collimator of the force/torque sensor assembly;

FIG. 11A is a plan view of a light sensitive transducer illustrating separate sectors associated with separate light beams;

DETAILED DESCRIPTION

I. Overview

Figure 1:
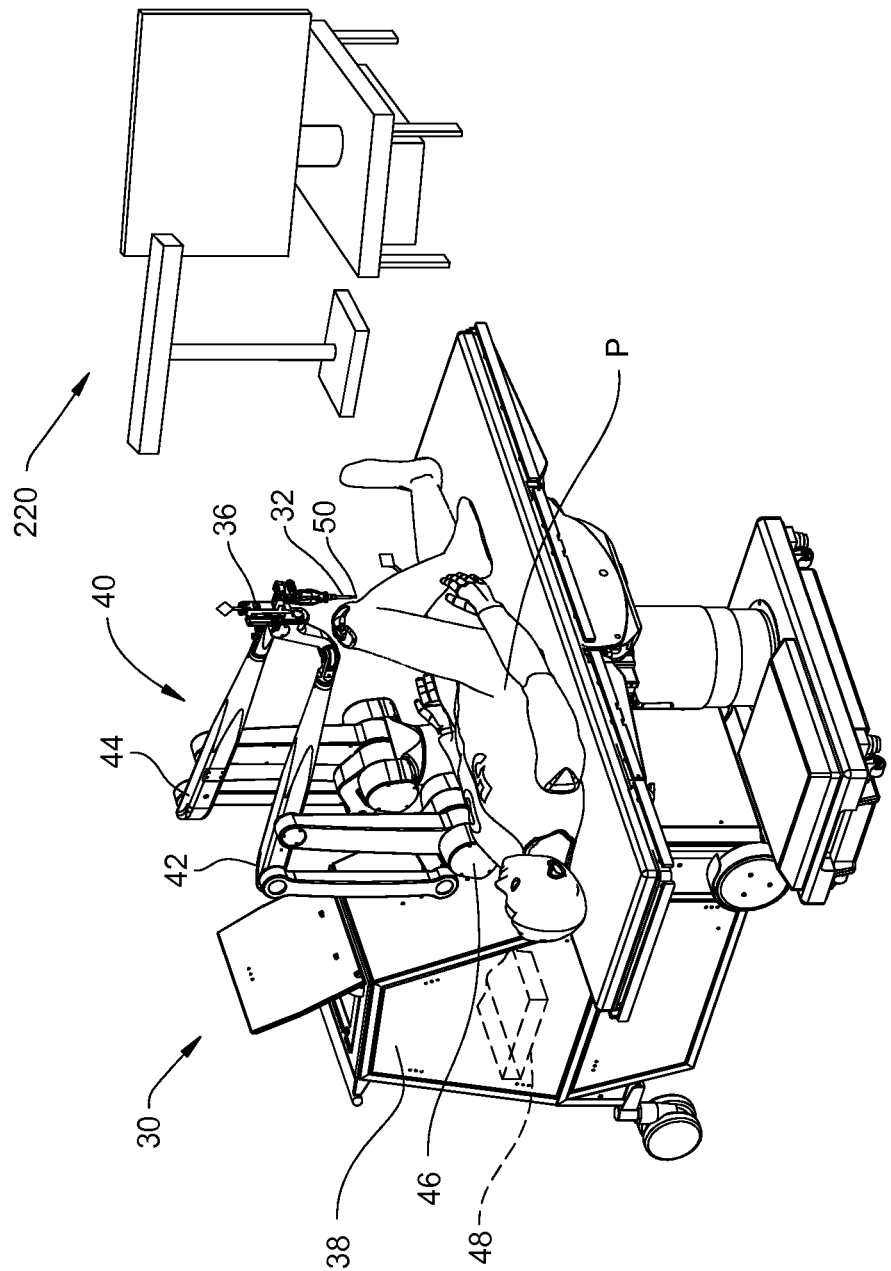
FIG. 1 is an overview of a robotic system including a manipulator used to position and advance a surgical instrument on a patient.

FIG. 1 illustrates a robotic surgical system including a manipulator 30 and a surgical instrument 32. The surgical instrument 32 is supported by the manipulator 30 for movement with respect to a patient P. In some embodiments, the manipulator 30 functions in manual and semi-autonomous modes to position the instrument 32 with respect to a target site on the patient P.

The manipulator 30 includes an instrument mount 36 to which the instrument 32 is rigidly attached. In some embodiments, the instrument 32 is also removably attached to the instrument mount 36. Manipulator 30 moves the instrument mount 36 to position and orient the instrument 32 so that the instrument 32 performs the intended medical/surgical procedure on the patient P.

A surgical navigation system 220 monitors the position and/or orientation of the instrument 32 relative to the target site. The surgical navigation system 220 communicates position and/or orientation data to the manipulator 30 so that the manipulator 30 can properly position the instrument 32.

Manipulator 30 includes a mobile cart 38. A linkage assembly 40 moveably connects the instrument 32 to the cart 38. In the illustrated embodiment this linkage assembly 40 comprises first and second parallel four bar link assemblies 42, 44. The position of each joint of each link assembly is set by a plurality of actuators 46. In FIG. 1, one of the actuators 46 associated with link assembly 42 is identified.

A manipulator controller 48, (partially shown as a phantom box in FIG. 1) is mounted to the cart 38. The manipulator controller 48 transmits the control signals that cause the actuators 46 to appropriately set the links of the link assemblies 42, 44. The manipulator controller 48 sets the positions of the links based on a number of input signals. These input signals include signals from the surgical navigation system 220.

The structure of the manipulator 30, including the manipulator controller 48, and the instrument 32 are set forth in more detail is U.S. patent application Ser. No. 13/958,070, filed Aug. 2, 2013, entitled, "Surgical Manipulator Capable of Controlling a Surgical Instrument in Multiple Modes," the disclosure of which is hereby incorporated by reference.

In some embodiments the instrument 32 includes a power generating unit (not shown). The power generating unit converts electrical signals into a form of energy that is applied to the patient P. This energy may be mechanical, sonic, thermal, RF, EM or photonic. When the instrument 32 includes a power generating unit, the energy is applied to the target site through an energy applicator 50. In the illustrated embodiment, the instrument 32 includes an energy applicator 50 in the form of a cutting bur for cutting tissue such as bone. The bur extends from a handpiece of the instrument 32.

II. Force/Torque Sensor Assembly

Figure 2:
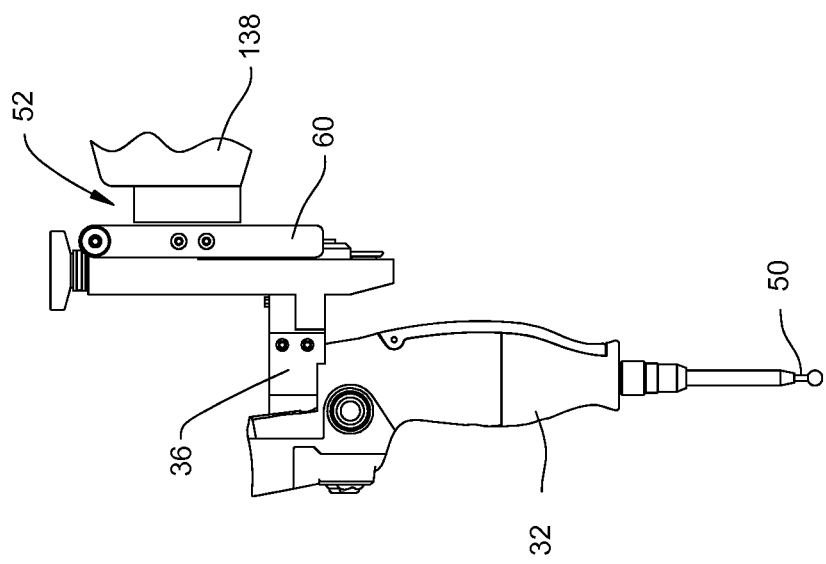
FIG. 2 is a side view of a force/torque sensor assembly to which the surgical instrument, an instrument mount, and a mounting plate are attached.

As shown in FIG. 2, a force/torque sensor assembly 52 is provided to react to loads applied to the instrument 32. The loads may include resistive forces and torques to which the instrument 32 is exposed as a result of the instrument 32 being pressed against tissue. The loads may also include forces and torques applied to the instrument 32 by a user when the user desires to set a position and/or orientation of the instrument 32. Manipulator controller 48 sets the position of the links, and thus the instrument 32, based on the forces and torques measured by the force/torque sensor assembly 52.

Figure 3:
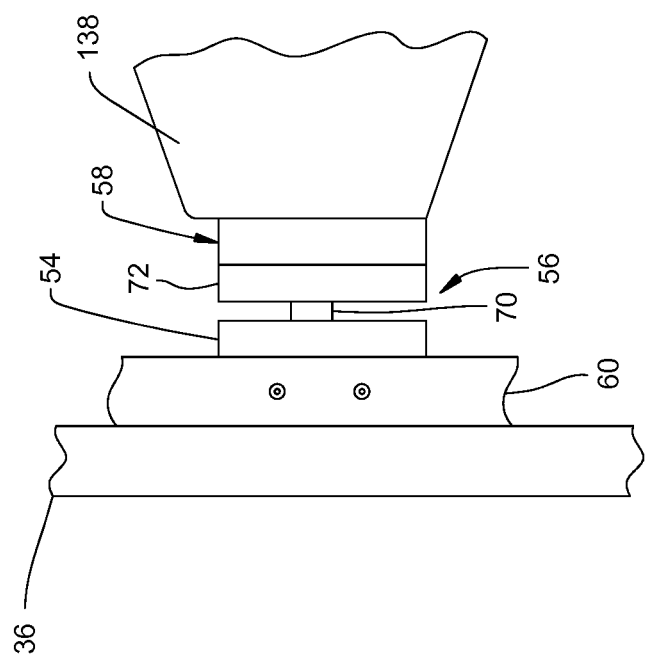
FIG. 3 is a side view of the force/torque sensor assembly seated between an arm of the manipulator and mounting plate, the force/torque sensor assembly including a head plate, a diverter plate with an inner and outer hub, and a base plate.
Figure 4:
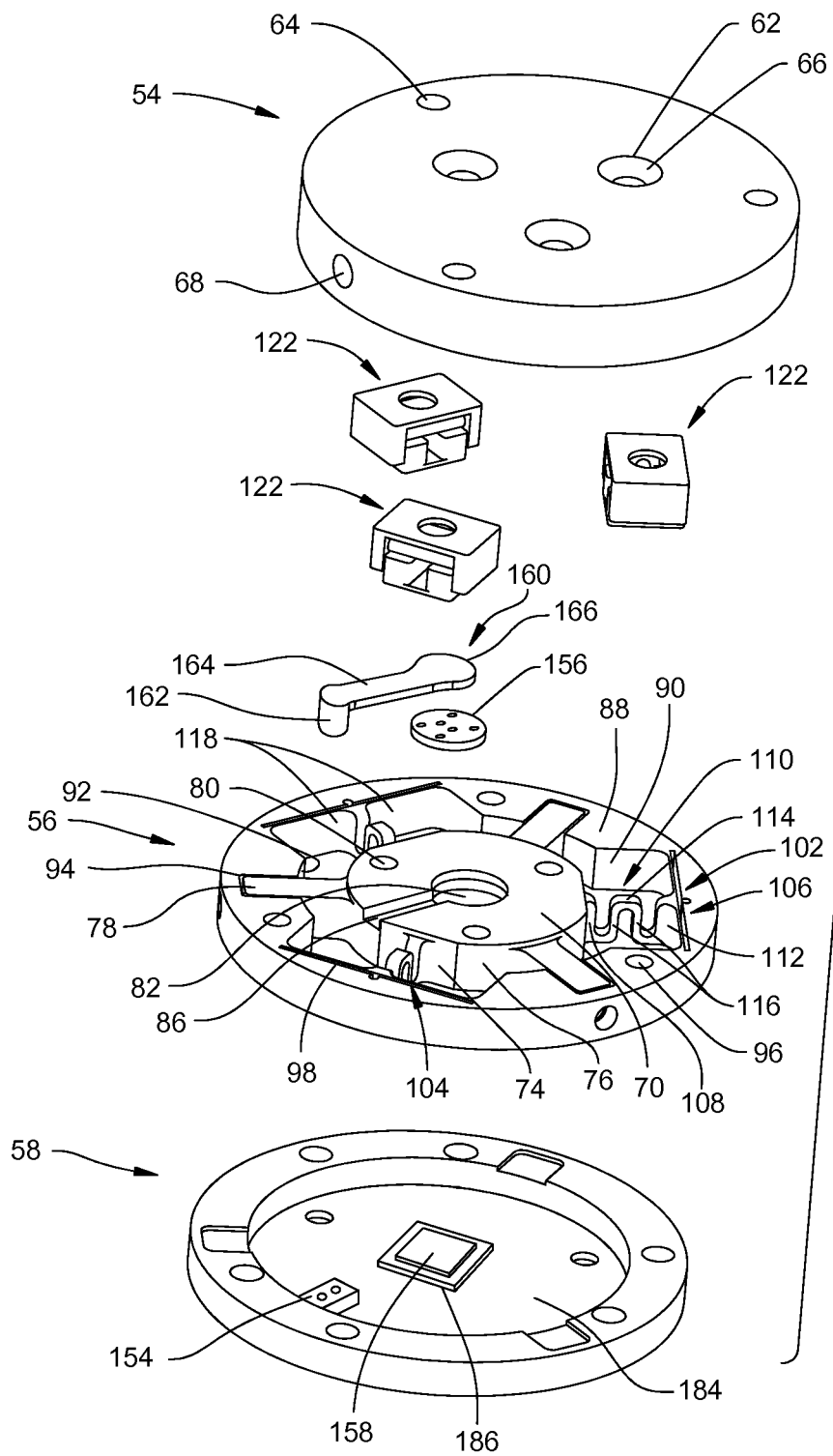
FIG. 4 is an exploded perspective view of the force/torque sensor assembly.

The force/torque sensor assembly 52, as shown in FIGS. 3 and 4, acts between the linkage assembly 40 and the instrument 32. The force/torque sensor assembly includes a head plate 54, a diverter plate 56 and a base plate 58. These plates 54, 56, 58 support the force/torque sensor assembly 52 for operation between the linkage assembly 40 and the instrument 32. In FIG. 3, the widths of the plates 54, 56 and 58 are exaggerated for purposes of illustration.

Referring to FIG. 4, the head plate 54 is disc shaped so as to have opposed proximally and distally directed faces that are planar and parallel to each other. Head plate 54 is formed from a single piece of stainless steel or other metal alloy. Head plate 54 has a thickness of approximately 6.5 mm. In some embodiments, head plate 54 has a diameter of between about 4.5 and 6.5 mm. Head plate 54 is attached to a proximally directed face of a mounting plate 60. The mounting plate 60 is fixed to the instrument mount 36. (Here "proximal" is understood to be towards the manipulator cart 38, away from the target site to which the instrument 32 is to be applied and "distal" is understood to be away from manipulator cart 38, towards the target site to which the instrument 32 is to be applied).

Sets of first and second throughbores 62, 64 extend between the opposed faces of the head plate 54. The first throughbores 62 are located radially outward from the center of the head plate 54. The first throughbores 62 are equally spaced from each other. A proximal opening of first throughbores 62 is defined by a tapered recess 66 that is angled inwardly toward the center of first throughbores 62. Second throughbores 64 are spaced radially outwardly from first throughbores 62 so as to be located a small distance inwardly from an outer perimeter of head plate 54. The second throughbores 64 are also equally spaced from each other, yet not radially aligned with the adjacent first throughbore 62. Head plate 54 is further formed to define a side bore 68 that extends radially inwardly from a side surface of the head plate 54. Threaded fasteners (not shown) extend through second throughbores 64 to hold the head plate 54 to the mounting plate 60.

Diverter plate 56 is located between the head plate 54 and the base plate 58. Diverter plate 56 includes inner and outer sensor members. In the embodiment shown, the inner and outer sensor members are inner and outer hubs, 70 and 72, respectively. Inner hub 70 extends distally forward of the outer hub 72. Inner hub 70 is connected to and able to move relative to the outer hub 72. Outer hub 72 is statically secured to base plate 58. The inner hub 70 is statically secured to head plate 54. The hubs 70, 72 are both formed out of a single piece of hardened stainless steel.

Inner hub 70 has a generally circular outer shape. Inner hub 70 is disposed within the outer hub 72. An outer perimeter of the inner hub 70 is defined, in part, by three flat surfaces 74 that are arcuately and equally spaced from each other. A curved surface 76 is located between each adjacent pair of flat surfaces 74.

Tines 78 extend radially outwardly from each curved surface 76. Tines 78 are equiangularly spaced apart from each other and extend from the centers of curved surfaces 76. Along the axes that extend between the opposed proximally and distally directed faces of the tines 78, the tines 78 have a depth that is from about 0.25 mm to about 1.0 mm less than the depth of inner hub 70. The proximal faces (not numbered) of the tines 78 are flush with the proximal face of the inner hub 70. The distally directed faces (not numbered) of the tines are thus recessed relative to the adjacent distally directed face of inner hub 70.

Three hub throughbores 80 are located a short distance inward from the outer perimeter of inner hub 70. Hub throughbores 80 have openings with a diameter approximately equal to the diameter of first throughbores 62 in head plate 54. Each hub throughbore 80 aligns with a separate first throughbore 62. Inner hub 70 has a centrally located central throughbore 82. Central throughbore 82 is larger in diameter than hub throughbores 80. A cylindrical step 84 projects radially from an inner surface that defines the central throughbore 82. Step 84 is recessed proximally away from the distal face of the inner hub 70. Step 84 extends inwardly approximately 0.75 mm from the inner surface of central throughbore 82. A groove 86 extends radially outwardly from central throughbore 82. Groove 86 is recessed relative to the distal face of inner hub 70. The base of groove 86 is coplanar with step 84.

Figure 5:
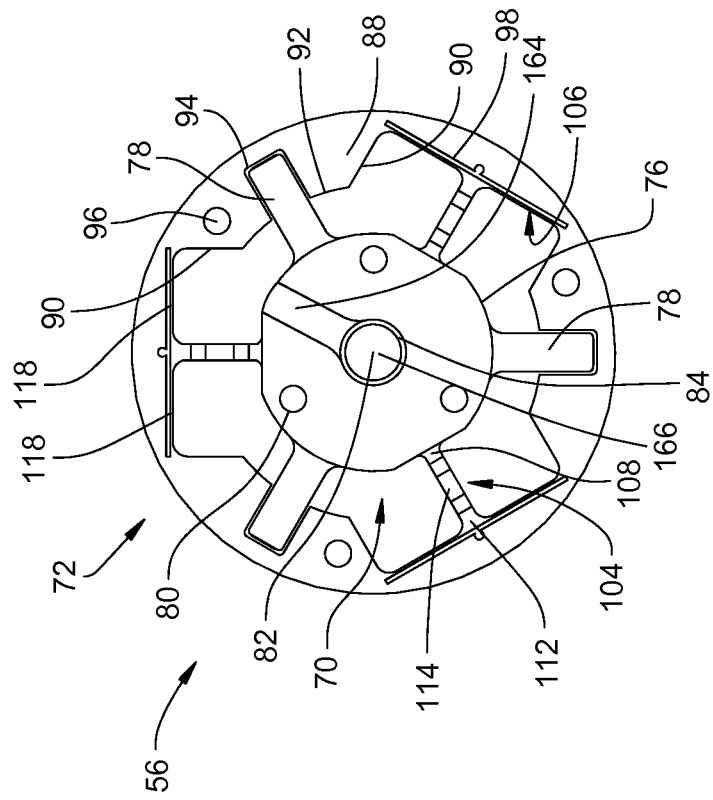
FIG. 5 is a plan view of a diverter plate of the force/torque sensor assembly.

As shown in FIG. 5, outer hub 72 is generally ring-like in shape. Outer hub 72 has a diameter approximately equal to that of head plate 54. The outer hub 72 has the same proximal face-to-distal face depth as the tines 78. Thus the depth of the outer hub 72 is less than that of inner hub 70. The distal face of inner hub 70 is raised above the distal face of outer hub 72, as seen in FIG. 3. In FIG. 3, the extent to which the inner hub 70 projects forward from the outer hub 72 is exaggerated for purposes of illustration.

Outer hub 72 has three inwardly directed tabs 88. Tabs 88 are equiangularly spaced apart from each other. Each tab 88 has side surfaces 90 that taper inwardly towards each other. Each tab 88 has an arcuately shaped inner surface 92. Inner surfaces 92 extend around a common circle that is concentric with the center axis of outer hub 72. Each tab 88 is bisected by a tine slot 94. Each tine slot 94 extends radially outwardly from the inner surface 92. Each tab 88 also has a tab throughbore 96. Tab throughbores 96 are spaced circumferentially apart along the outer hub 72. Outer hub 72 is further shaped so that there is planar inner surface, a flat 98, between each adjacent pair of tabs 88.

Each tine 78 extends into a separate one of the tine slots 94. Tine slots 94 have a width that is approximately 0.1 mm to 0.75 mm greater than the width of tines 78. Diverter plate 56 is further dimensioned so that when the outer hub 72 is in the neutral position, the outer end of each tine 78 is spaced approximately 0.1 mm to 0.75 mm from the adjacent inwardly directed surfaces of the tab 88 that defines the associated tine slot 94.

As seen in FIGS. 4 and 5, a spring arrangement movably attaches the inner hub 70 to the outer hub 72. The spring arrangement includes three spring devices 102. Each spring device 102 extends outwardly from a separate one of the flat surfaces 74. Each spring device 102 includes a serpentine spring 104 and a leaf spring 106 arranged in series.

Each serpentine spring 104 includes a head 108, a torso 110 and a leg 112. The head 108 is the portion of the serpentine spring 104 connected to the inner hub 70. The head 108 projects radially outwardly from the flat surface 74.

The torso 110 extends from the head 108. Each torso includes a plurality of U-shaped folds 114 and pleats 116 extending from the U-shaped folds 114. In one embodiment, the torso 110 is formed from plural pleats 116 and folds 114. The pleats 116 are parallel to each other. Folds 114 are generally semi-circular in shape. A first one of the folds 114 connects one pleat 116 to the head 108. A second one of the folds 114 connects two pleats 116 together. A third one of the folds 114 connects another pleat 116 to the leg 112. Folds 114 are flexible. The flexibility of the folds 114 allows the longitudinal axes of the pleats 116 to shift positions.

Each leg 112 comprises a relatively thick base. This base of the leg 112 is the portion of the leg 112 from which the adjacent fold 114 extends. Two feet 118 extend outwardly from the outer end of each leg 112. Each foot 118 is in the form of a thin strip having a thickness of approximately 0.25 to 0.75 mm. The feet 118 forming a pair of feet 118 are coplanar. Each foot 118 has an end that merges into the side surface of an adjacent tab 88. The feet 118 merge into the tabs 88 at locations inwardly radially from the flats 98. Thus, each pair of feet 118 is parallel with and spaced inwardly from the adjacent flat 98. In some embodiments, this spacing is between approximately 0.25 mm and 0.75 mm. Given that feet 118 are formed from flexible material and the feet 118 of each pair of feet 118 are coplanar, each pair of feet 118 defines one of the leaf springs 106.

Figure 5A:
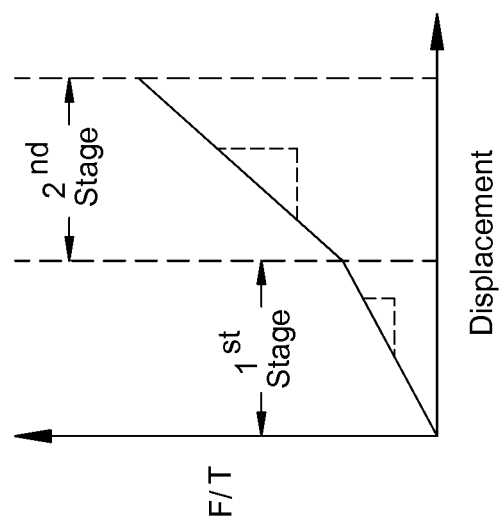
FIG. 5A is a graph showing two stages of sensitivity of the force/torque sensor assembly.
Figure 6:
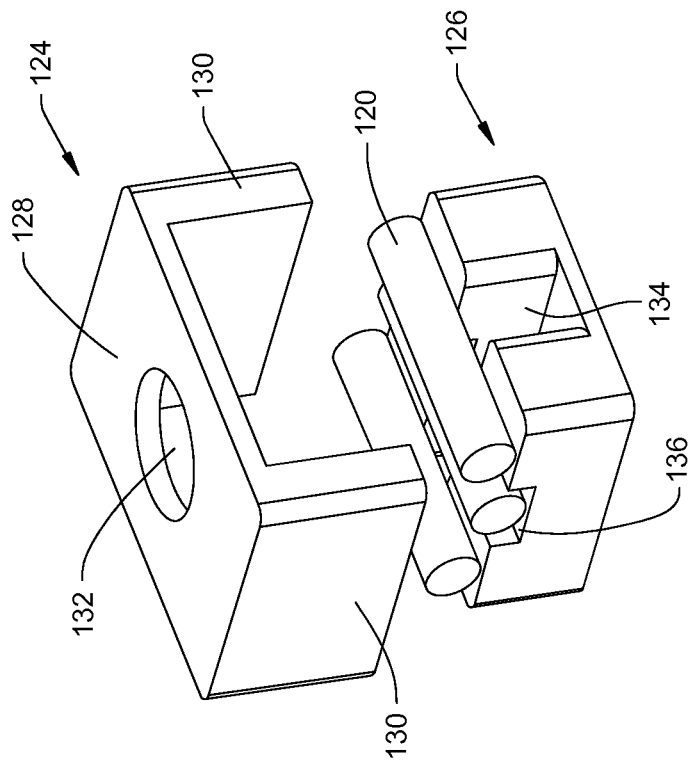
FIG. 6 is an exploded perspective view of pins in a pin housing.
Figure 7:
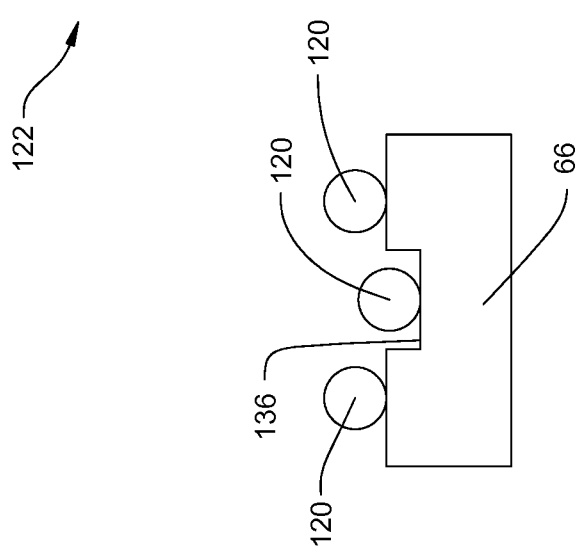
FIG. 7 is a side view illustrating the pins in the pin housing.
Figure 9:
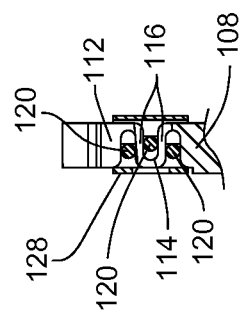
FIG. 9 is a partial cross-sectional view through the pins in the serpentine spring.
Figure 8:
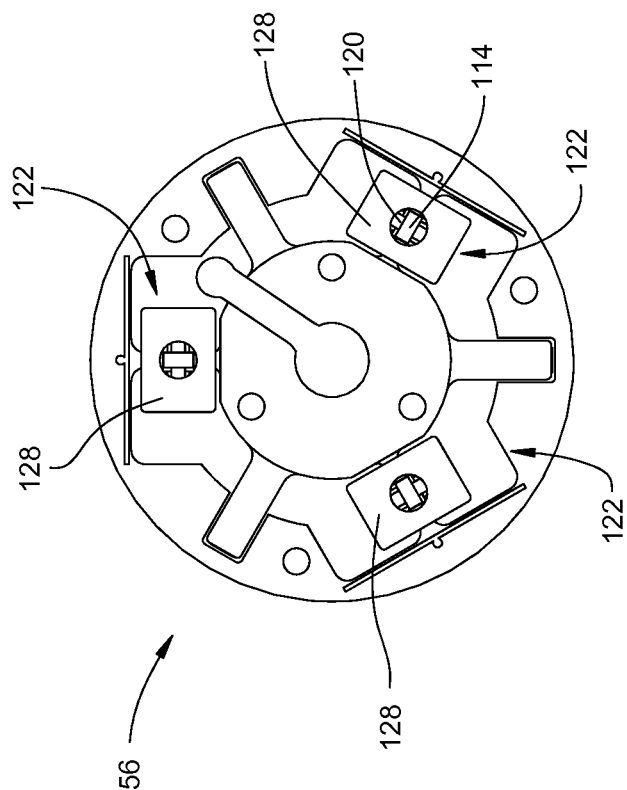
FIG. 8 is a plan view of the diverter plate with the pins located in serpentine springs of the diverter plate.

Each spring device 102 can thus be considered to be a plural stage spring device. One spring stage is the serpentine spring 104 formed by folds 114 and pleats 116. The second spring stage is the leaf spring 106 formed by feet 118. FIG. 5A illustrates how these first and second stages affect the resolution of force/torque measurements enabled by the force/torque sensor assembly 52.

Referring to FIGS. 6-9, each serpentine spring 104 accommodates a plurality of pins 120. Each pin 120 is generally cylindrical in shape. Each pin 120 is comprised of hardened stainless steel. Each pin 120 has a length such that the pin 120 can extend across the entire width of the adjacent torso 110. The pins 120 have a radius that is approximately 0.625 mm to 2.5 mm less than the radius of circles defined by the adjacent folds 114. In one embodiment, pins 120 are approximately 6.25 mm in length and 1.168 mm in diameter. A first one of the pins 120 extends between the head 108 and the adjacent pleat 116. A second of the pins 120 is located between the two pleats 116. A third of the pins 120 is located between the radially outermost pleat 116 and the leg 112.

Each set of three pins 120 is seated in a pin housing 122. Pin housing 122 is comprised of a cap 124 and a pin housing base 126. Pins 120 are positioned between the cap 124 and the pin housing base 126. Cap 124 includes a panel 128, and two opposed side walls 130. Panel 128 is rectangular in shape. Each side wall 130 extends downward from side edges of panel 128. A panel bore 132 extends through the center of panel 128. Pin housing base 126 is generally block-like in shape. A base groove 134 extends through the middle of pin housing base 126. Base groove 134 is dimensioned to accept torso 110. A pin groove 136 extends through the center of pin housing base 126. Pin groove 136 intersects and is perpendicular to the base groove 134. The pin groove 136 is of shallower depth than the base groove 134.

Figure 10:
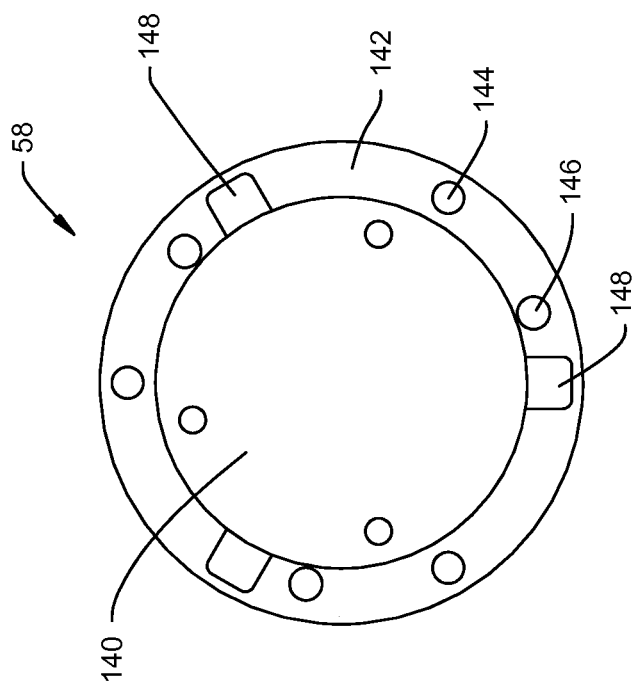
FIG. 10 is a plan view of the base plate.

Referring to FIGS. 4 and 10, base plate 58 is attached to a distal end component 138 of the linkage assembly 40 of the manipulator 30. This component 138 may be a coupler, robot flange, wrist or other component. The base plate 58 is formed from hardened stainless steel. Base plate 58 is generally disc like in shape and has an outer diameter equal to that of the outer diameter of outer hub 72. The base plate 58 has an inner circular section 140 and an outer rim 142. Rim 142 extends circumferentially around the outer edge of circular section 140. Rim 142 has a distally directed top face that is raised above and parallel with the distally directed face of inner circular section 140. Rim 142 is formed to have a plurality of first openings 144 and second openings 146 that extend between the opposed proximally and distally directed faces of the rim 142. There are three first openings 144 that are equiangularly spaced apart from each other. There are three second openings 146 that are equiangularly spaced apart from each other.

A plurality of recesses 148 are located on the distal face of rim 142. The recesses 148 are open along the inner surface of rim 142. Each recess 148 is generally in the form of a rectangle. Each recess 148 is defined by a pair of opposed side surfaces and a bottom surface. Each recess 148 is shaped so the distance across the opposed side surfaces are equal to the width across tine slots 94. Three recesses 148 are equally spaced apart on the distal face of rim 142. The recesses 148 are positioned so that when force/torque sensor assembly 52 is assembled, each recess 148 is in registration with one of the tine slots 94 in the diverter plate 56.

Fasteners (not shown) extend through the first openings 144 to hold the base plate 58 to the distal end component 138 of the linkage assembly 40. Fasteners (not shown) extend through the second openings 146 and tab throughbores 96 to hold the diverter plate 56 to the base plate 58.

The force/torque sensor assembly 52 is an optically-based sensor assembly that includes a light source 154 mounted to the base plate 58. Light from the light source 154 is directed through a collimator 156 onto a light sensitive transducer 158. The collimator 156 converts the light into a plurality of light beams. As loads are applied on the instrument 32, the collimator 156 is displaced relative to the light sensitive transducer 158 so that the light beams strike different pixels of the light sensitive transducer 158. This movement of the light beams effectively senses the forces and torques applied to the instrument 32 and can be correlated into force and torque measurements.

The light source 142 is located adjacent to the outer edge of the distal face of inner circular section 140. Light source 142 is thus adjacent and may be coplanar with the inwardly directed face of rim 142. In some embodiments, light source 142 is an LED light source that includes one or more light emitting diodes (LEDs). Two LEDs are shown in FIG. 4.

A light pipe 160 is mounted to a distal face of inner hub 70. The light pipe 160 receives light emitted by the light source 142 and directs it to the collimator 156. Light pipe 160 is shaped to have a cylindrical stem 162. The proximal end of the stem 162 is located above light source 142 to receive light emitted from the light source 142. A branch 164 extends perpendicularly from a distal end of stem 162. Branch 164 is dimensioned to seat in inner hub groove 86. A circular head 166 extends from a free end of the branch 164. Head 166 is formed to have a disc shaped lens. Head 166 is dimensioned to seat in a counterbore to central throughbore 82. Upon assembly of the force/torque sensor assembly 52, the light pipe 160 is positioned so that the head 166 is disposed in the counterbore above the collimator 156.

The light pipe 160 is formed of plastic, glass or other material that is able to convey light emitted by light source 142 to the collimator 156. In some embodiments, the light pipe 160 is a fiber optic conduit or an injection molded light pipe comprised of a single piece of plastic. In other embodiments the light pipe 160 is eliminated altogether and the LEDs are instead positioned directly above the collimator 156 or other light focusing device.

Collimator 156 is fixed to the inner hub 70. The collimator 156 may be fixed by adhesive, tape, welding or other methods. Collimator 156 is seated in the counterbore beneath the light pipe 160. Collimator 156 is disc shaped and has a diameter approximately equal to counterbore so that the outer perimeter of collimator 156 seats on step 84 formed in inner hub 70. In one embodiment collimator 156 has a diameter of approximately 7.5 mm. The collimator 156 is formed from quartz or alternatively is built into the diverter plate 56 (e.g., machined to be a part of the diverter plate 56).

As seen in FIG. 11, collimator 156 is formed to have a plurality of light openings. Four of the light openings are shown as normal bores 172, 174, 176, 178. Normal bores 172, 174, 176, 178 are throughbores formed normally to opposed top and bottom surfaces of the collimator 156, i.e., normal bores 172, 174, 176, 178 extend through collimator 156 along axes perpendicular to the opposed top and bottom surfaces of the collimator 156. The normal bores 172, 174, 176, 178 are arranged in a square pattern and spaced equidistantly from a center of collimator 156.

Figure 13A:
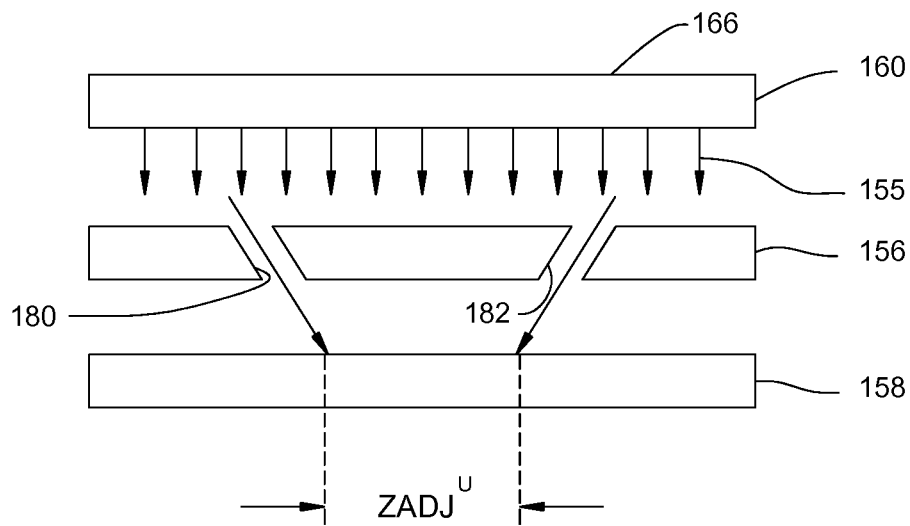
FIG. 13A is a cross-sectional view illustrating the collimator with a plurality of angled bores extending through the collimator.
Figure 13B:
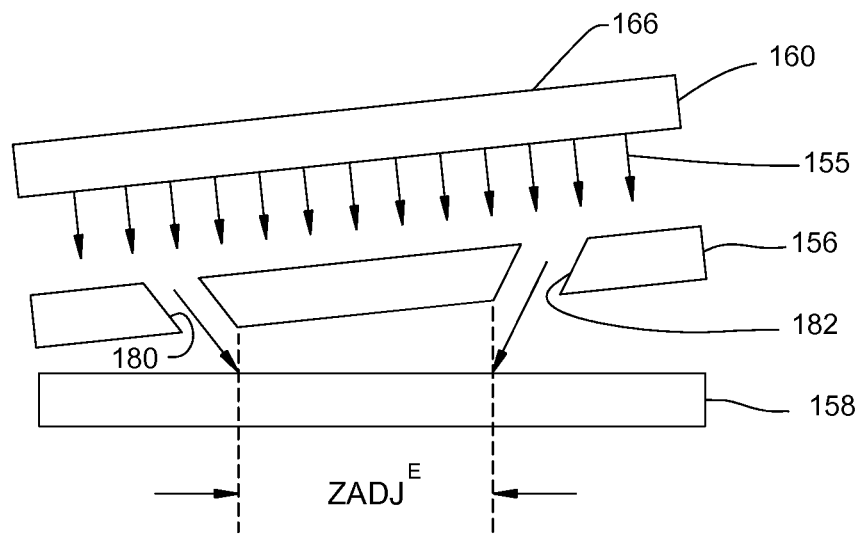
FIG. 13B is a cross-sectional view illustrating the collimator with the plurality of angled bores in a different orientation than FIG. 13A.

The plurality of light openings also include two angled bores 180, 182, as seen in FIGS. 11, 13A and 13B. Angled bores 180, 182 are angled in that they extend through the collimator 156 along axes that are arranged at an acute angle to the normal axes between the top and bottom surfaces of the collimator 156. Angled bores 180, 182 are spaced equally away from the center of the collimator 156. Angled bores 180, 182 angle inwardly towards the center of collimator 156. In some embodiments, bores 172, 174, 176, 178, 180, 182 are square-shaped. In other embodiments, bores 172, 174, 176, 178, 180, 182 are circular in shape.

The light sensitive transducer 158 is located centrally on a printed circuit board 184. The printed circuit board 184 is seated on the distally directed face of circular section 140 and is thereby fixed with respect to the base plate 58. The printed circuit board 184 has a shape and size approximately equal to that of the distal face of circular section 140. In the illustrated embodiment, the light sensitive transducer 158 is an image sensor. The image sensor may be a CMOS image sensor or any other light sensitive transducer. In one version the image sensor is the LUPA 1300A sensor available from Cypress Semiconductor of San Jose, Calif.

The light sensitive transducer 158 contains a number of individual light sensitive elements such as pixels. The pixels are arranged in a row-by-column format or matrix. Each pixel outputs a signal representative of the strength of the light striking the pixel. In some embodiments, light sensitive transducer 158 has a pixel size of 25 microns or less. In certain embodiments, the light sensitive transducer 158 has a resolution of 1280×1024 pixels. Each pixel is approximately 14 microns by 14 microns in this embodiment.

A voltage regulator 186 is mounted to printed circuit board 184. Voltage regulator 186 supplies a constant voltage signal to light sensitive transducer 158. In the illustrated embodiment light sensitive transducer 158 is shown mounted to an exposed face of voltage regulator 186.

The bores 172, 174, 176, 178, 180, 182 of the collimator 156 divide the light from the light pipe 160 into a number of separate light beams. The light beams strike a face of the light sensitive transducer 158. Light sensitive transducer 158 outputs signals representative of the locations that the light beams strike on the light sensitive transducer 158. These signals may be sent to a local controller (not shown) for processing. The signals are processed to ultimately yield forces and torques. The manipulator controller 48 utilizes the forces and torques to control movement of the actuators 46 and, thus, the instrument 32. It should be appreciated that the output signals from the light sensitive transducer 158 could also be sent directly to the manipulator controller 48 in other embodiments.

During surgery, loads applied to the instrument 32 cause at least miniscule displacement of the instrument 32. This displacement of the instrument 32 is transmitted through the instrument mount 36 and the mounting plate 60 to the head plate 54 and inner hub 70—all being considered a single rigid body. The displacement of the inner hub 70 results in a shift of the position and/or orientation, i.e., movement, of the collimator 156 relative to the light sensitive transducer 158. As a result, the light beams from the bores 172, 174, 176, 178, 180, 182 also move thereby enabling the determination of forces and torques.

III. Determining Forces and Torques

Force/torque sensor assembly 52 is considered to be in a loaded state when loads are applied to the instrument 32. When loads (e.g., forces and/or torques) are applied to the force/torque sensor assembly 52, the inner hub 70 can engage in six types of movement relative to the outer hub 72. Three of the movements are translation. The inner hub 70 can move along the x-axis, arbitrarily, the horizontal axis through the inner hub 70 in FIG. 5. Inner hub 70 can engage in movement along the y-axis, arbitrarily the vertical axis through the inner hub 70 in FIG. 5. The inner hub can engage in movement along the z-axis, arbitrarily the axis through the center of the inner hub 70 that extends in and out of the plane of FIG. 5. Inner hub 70 can also engage in at least some rotational movement around each of the above-identified axes. Typically as a result of the application of forces and torques to the force/torque sensor assembly 52, the inner hub 70 engages in several of these movements.

When there is an application of force and/or torque to the instrument 32, the collimator 156 and light pipe 160, consequently, equally move with the inner hub 70. This displacement of the collimator 156 causes light emitted by the light source 154 to strike different pixels of the light sensitive transducer 158. The light sensitive transducer 158 outputs signals that show the movements of the collimated light which is directly related to the forces and torques applied to the instrument 32.

In the absence of the application of any forces or torques to the force/torque sensor assembly 52, the force/torque sensor assembly 52 is considered in the unloaded state. When the manipulator 30 is in use, even in the absence of other forces, gravity imposes forces and torques on the force/torque sensor assembly 52. It should be understood that a major component of this gravitation force is the force gravity places on the instrument 32 and energy applicator 50. This gravitational force causes some displacement of the inner hub 70 relative to the outer hub 72 when inner hub 70 is in the pure unloaded state. Given the nominal nature of this force, and nominal displacement of the inner hub 70, the locations of the light beams are considered to be in their gravity-offset unloaded state.

During operation of manipulator 30, the light emitted by the light source 154 (represented by numeral 155 in the Figures) extends through bores 172, 174, 176, 178, 180, 182 as light beams. These light beams strike different clusters of pixels on the surface of the light sensitive transducer 158. More specifically, each light beam strikes a different cluster of pixels in the unloaded state and in the loaded state. The shifts in the positions/locations of the clusters of pixels from the unloaded state to the loaded state, e.g., from a start of a time frame (initial cluster) to an end of the time frame (final cluster), are used to determine the forces and torques.

Figure 12A:
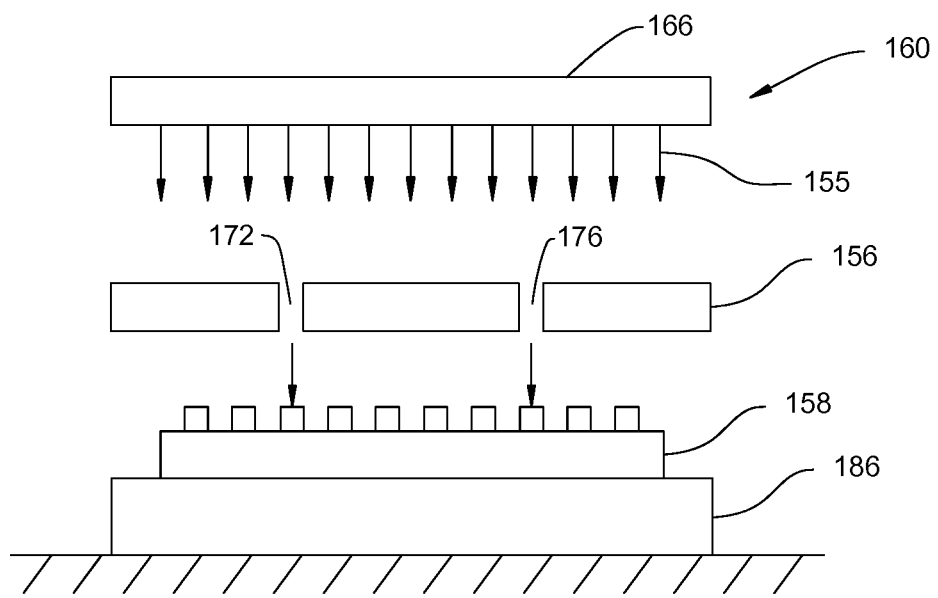
FIG. 12A is a cross-sectional view illustrating the collimator with a plurality of normal bores extending through the collimator.
Figure 12B:
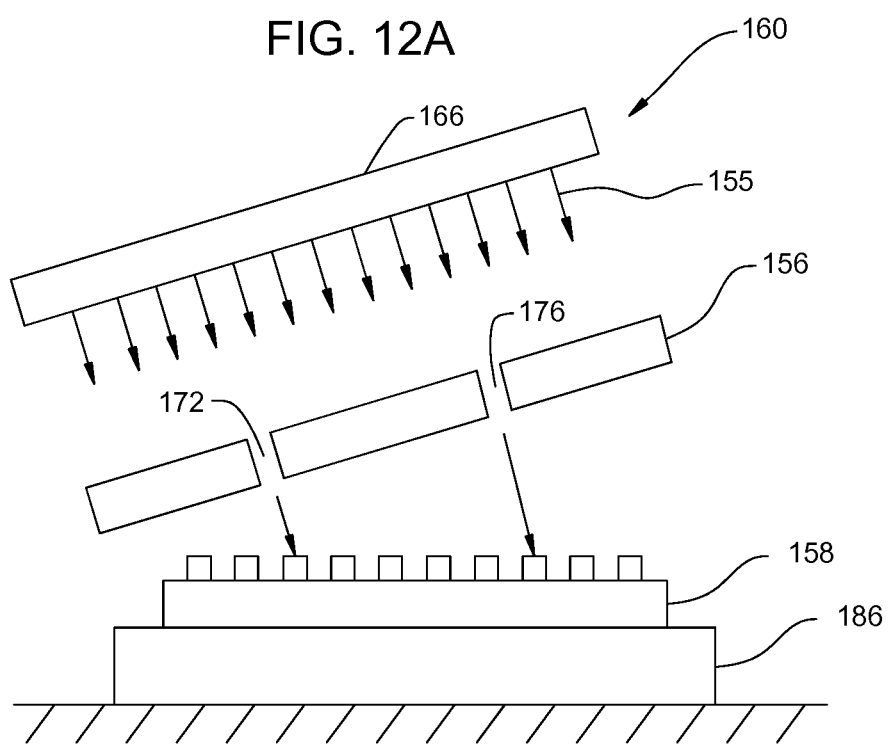
FIG. 12B is a cross-sectional view illustrating the collimator with the plurality of normal bores in a different orientation than FIG. 12A.

FIGS. 12A and 12B depict two of the light beams that pass through two of the normal bores, bores 172 and 176 in the unloaded and loaded states. FIGS. 13A and 13B depict how two light beams pass through the angled bores 180, 182 in the unloaded and loaded states. Notably, the light beams that pass through the angled bores 180, 182 strike the light sensitive transducer 158 as ellipses.

During manufacture, the collimator 156 is arranged with respect to the light sensitive transducer 158 so that for the maximum range of motion of each light beam (for all six degrees of freedom) each light beam is constrained to separate sectors S (or windows) on the light sensitive transducer 158, so that the pixels in each sector S can be separately electronically processed to determine a location of a centroid of the light beam on the light sensitive transducer 158. See, for example, the light beams 172B, 174B, 176B, 178B shown in FIG. 11A from normal bores 172, 174, 176, 178 that strike the light sensitive transducer 158 in separate sectors S1-S4 and the light beams 180B, 182B from angled bores 180, 182 that strike the light sensitive transducer 158 in separate sectors S5-S6. For the full range of displacement of the force/torque sensor assembly 52, each of the light beams are constrained to remain fully in their corresponding sectors S1-S6.

Figure 14B:
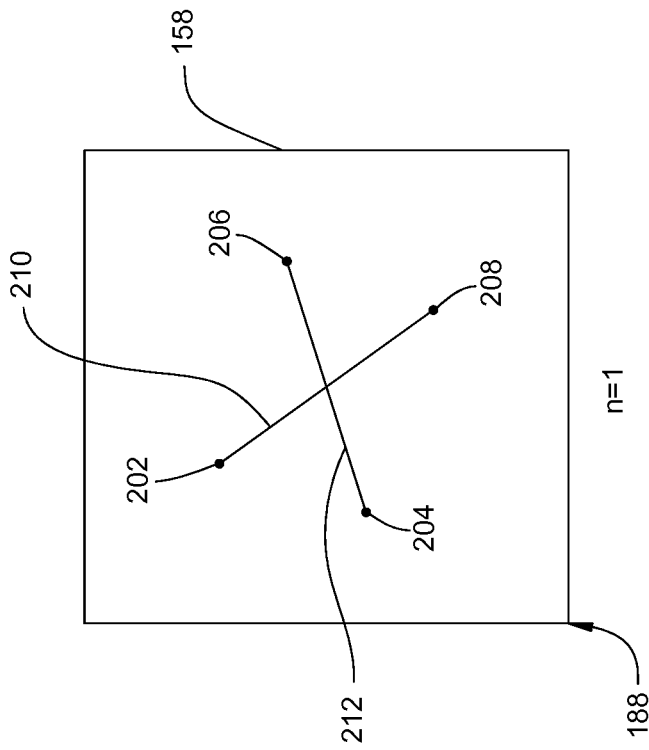
FIG. 14B is a plan view of the light sensitive transducer illustrating where light beams strike the light sensitive transducer at an end of the time frame.
Figure 14A:
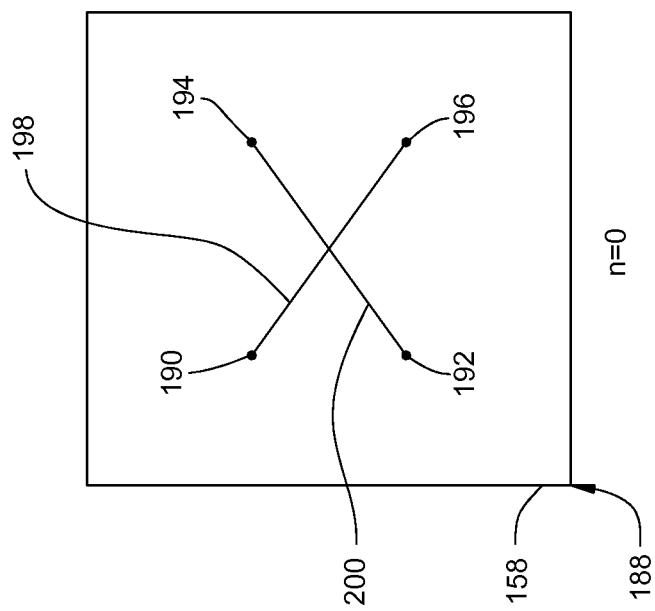
FIG. 14A is a plan view of the light sensitive transducer of the force/torque sensor assembly illustrating where light beams strike the light sensitive transducer at a start of a time frame.

The light sensitive transducer 158 continually outputs to manipulator controller 48 the signals emitted by each pixel in each sector S1-S6. Each pixel has a specific row/column location on the light sensitive transducer 158. The signals received by manipulator controller 48 are proportional to the quantity of light that strikes the pixel at that location. For purposes of understanding the illustrated embodiment, the pixel at the lower left of FIGS. 14A and 14B is considered to be the pixel at row/column location (0, 0) 188.

As mentioned above, each light beam strikes a cluster of pixels in each sector S1-S6. Accordingly, the controller 48 receives from the light sensitive transducer 145 signals that make up an image that includes six sets of pixels, each set comprising output signals from multiple pixels that are exposed to light. For each of these sets of pixels, the controller 48 determines the centroid of the light beams.

Figure 15:
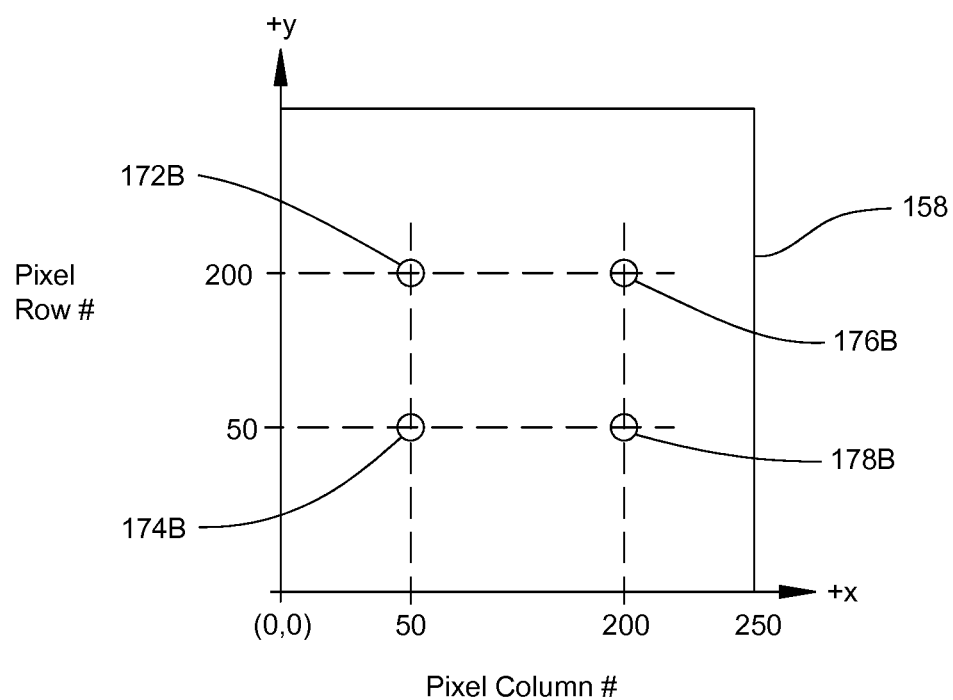
FIG. 15 is a plan view of the light sensitive transducer showing locations of centroids of lights beams.
Figure 15A:
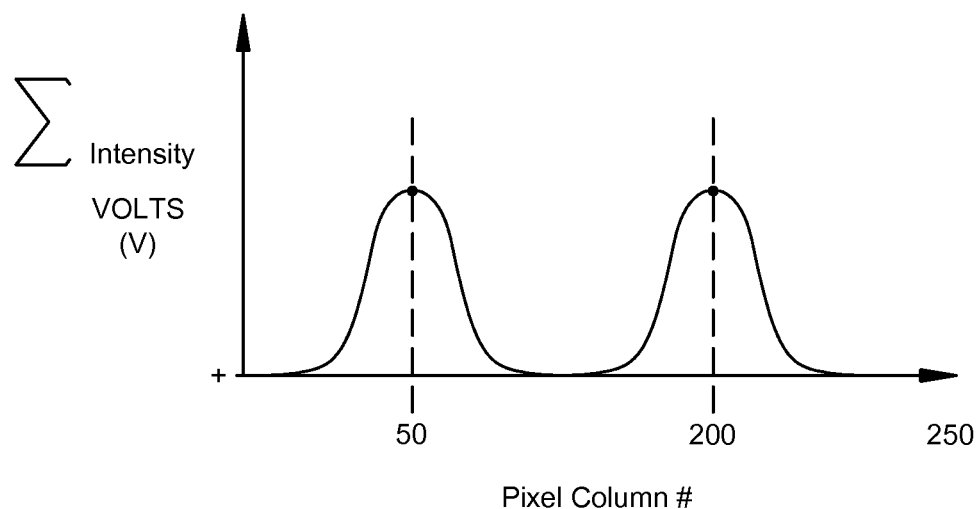
FIGS. 15A and 15B are graphs illustrating changes in signal intensity along pixel columns and rows, respectively, used to determine the centroids of the light beams illustrated in FIG. 15.
Figure 15B:
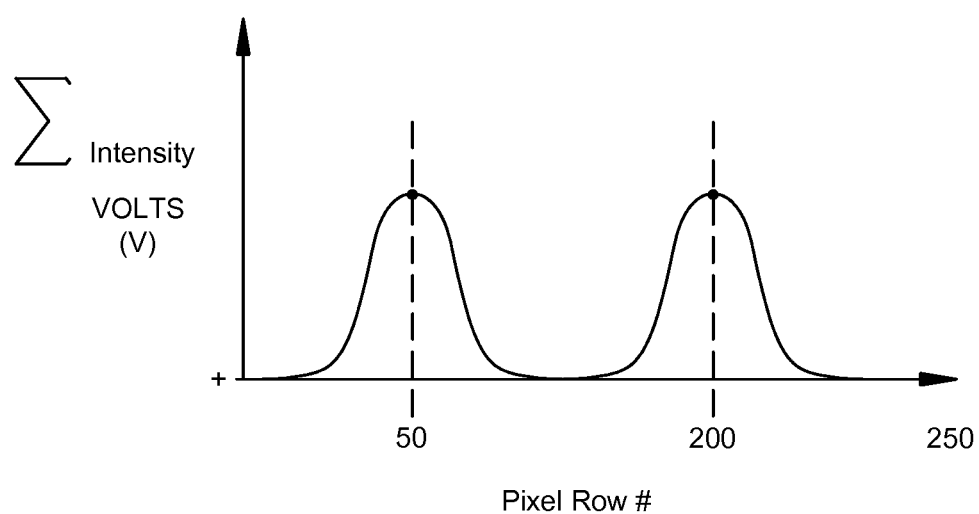

The centroids can be determined by processing the signal strengths in each set using conventional processing techniques, as shown in FIGS. 15, 15A, and 15B. For example, the light beams 172B, 174B, 176B, 178B shown in FIG. 15, which pass through the normal bores 172, 174, 176, 178, strike distinct clusters of pixels. These clusters are processed by summing the signal strengths, for each set of pixels associated with sectors S1-S4, along all the columns of pixels, and all the rows of pixels, in each sector and identifying the peak signal strengths along the columns and rows to identify the centroid in x, y coordinates. The peak signal strengths may be associated with a specific pixel location, but interpolation or other processing of the summed output signal values may result in the location of the peak signal strengths along the columns and rows not necessarily being bound by physical location of a single pixel. See an example of this processing in FIGS. 15A and 15B.

Controller 48 assigns the location of the centroid in the x-y coordinate system of the light sensitive transducer 158 to be on the on-sensor location to which the light beam is applied. Controller 48 performs the above processes six times, once for each light beam and sector. This process is repeated in each frame of operation of the force/torque sensor assembly 52. Therefore, for each frame of operation, twelve x, y coordinates are provided in the embodiment in which the collimator 156 has four normal bores 172, 174, 176, 178 and two angled bores 180, 182. The minimum frequency with which a complete set of signals for all the pixels is output is 1 Hz. In some embodiments, the frequency in which a complete set of signals for all pixels is output is at least 10 Hz or greater. Each set of signals can be considered to represent the positions of the light beams at the end of a single time frame.

It has been shown that in other embodiments fewer coordinates are needed to provide adequate input information to determine the forces and torques. See, for example, the light beams shown in FIG. 16. Here, only two light beams through two normal bores 216, 218 are shown along with the two light beams through the two angled bores 180, 182. In this case, eight coordinates x1, y1, x2, y2, x3, y3, x4, y4 are calculated by the controller 48 based on the centroids of the light beams. Still, only six of those coordinates are needed to solve for the forces and torques. These coordinates include x1, y2, x3, y3, x4, y4.

The basis for the selection of these coordinates x1, y2, x3, y3, x4, y4 comes from understanding how the light beams shift under each of the different force/torque conditions, e.g., for each of the six forces/torques being determined. These shifts are illustrated in FIG. 16.

Figure 16:
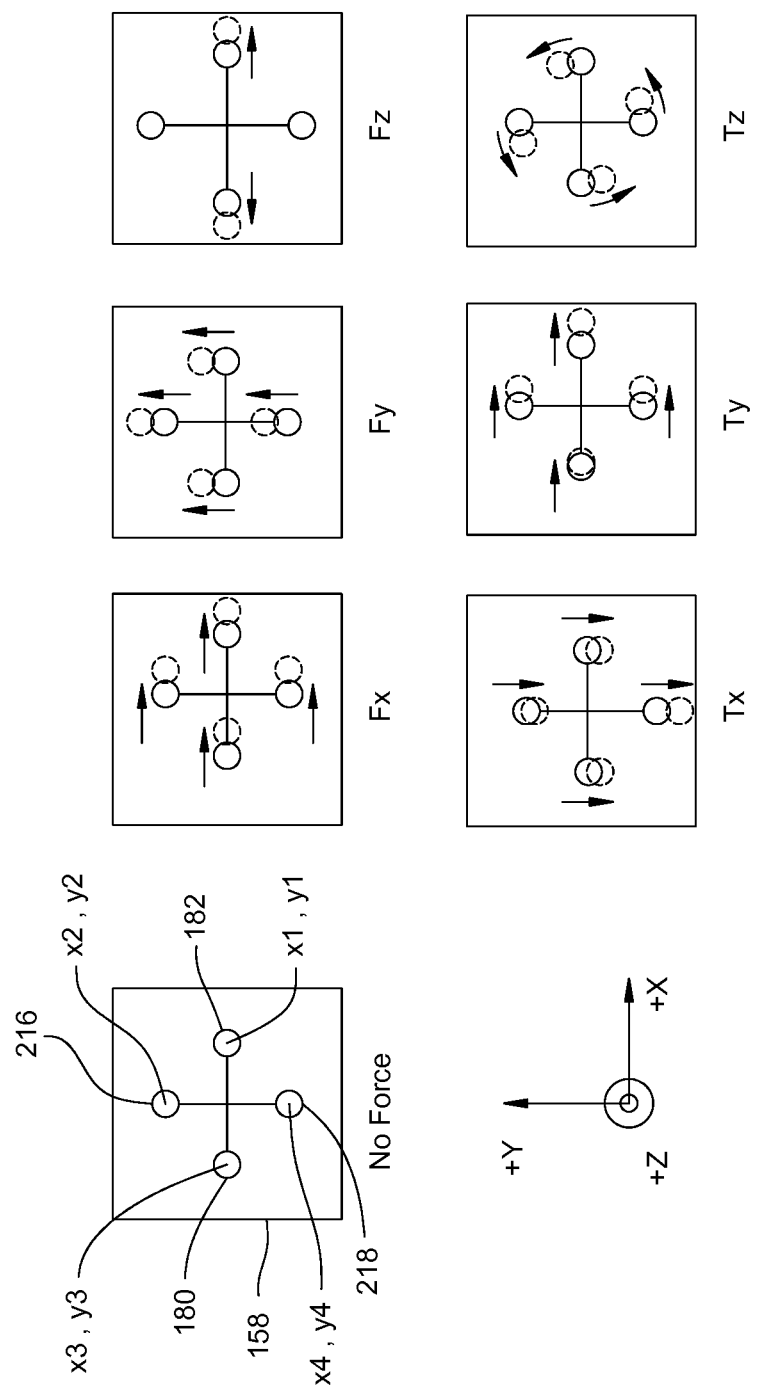
FIG. 16 is an illustration of the correlation between movement of light beams on the light sensitive transducer with three torques $T_x$, $T_y$ and $T_z$, and three forces $F_x$, $F_y$ and $F_z$.

As shown in FIG. 16, when a force $F_x$ is applied along the x-axis, each of the light beams shift equally along the x-axis, and therefore, $F_x$ can be correlated to a shift in one of the x coordinates of the light beams, such as by a shift in x1, x3, and/or x4. Similarly, when a force $F_y$ is applied along the y-axis, each of the light beams shift equally along the y-axis, and therefore, $F_y$ can be correlated to a shift in one of the y coordinates of the light beams, such as by a shift in y2, y3, and/or y4.

When a force $F_z$ is applied along the z-axis, the angled nature of the angled bores 180, 182 yields a change in the positions of their light beams on the light sensitive transducer 158 while the light beams through the normal bores 216, 218 remain unchanged (e.g., the centroids are unchanged although there may be small changes in the cluster of pixels affected by the light beam). This is a result of displacement of the collimator 156 toward or away from the light sensitive transducer 158 in the z-axis when force $F_z$ is applied. Owing to this displacement, the distance between the two angled light beams on the light sensitive transducer 158 changes. In FIG. 13A, this distance is depicted as distance ZADJ. The value of distance $ZADJ^U$ is scalar and constant throughout operation of force/torque sensor assembly 52 as representing the distance in the unloaded state. In FIG. 13B, $ZADJ^E$ shows how the distance changes in the loaded state. Therefore, since the angled bores 180, 182 direct their light beams radially inwardly along the x-axis toward the center, $F_z$ can be correlated to a shift in the x coordinates of the light beams through the angled bores, such as by a shift in x1 and x3, as illustrated in FIG. 16.

When a torque $T_x$ is applied about the x-axis, causing a pivoting of the collimator 156 about the x-axis, each of the light beams shift along the y-axis, but not all equally. As shown in FIG. 16, when the torque $T_x$ is applied, the shift of the light beam from normal bore 216 along the y-axis is less than the shift from normal bore 218 along the y-axis. The shift of the light beams from the angled bores 180, 182 along the y-axis falls somewhere in between. The pivoting of the collimator 156 about the x-axis causes one half of the collimator 156 to move closer to the light sensitive transducer 158 and the other half moves away from the light sensitive transducer 158 thereby resulting in different shift distances. As a result, $T_x$ can be correlated to a shift in the y coordinates of the light beams, such as by a shift in y2, y3, and/or y4.

Similarly, when a torque $T_y$ is applied about the y-axis, causing a pivoting of the collimator 156 about the y-axis, each of the light beams shift along the x-axis, but not all equally. As shown in FIG. 16, when the torque $T_y$ is applied, the shift of the light beam from angled bore 180 along the x-axis is less than the shift from angled bore 182 along the x-axis. The shift of the light beams from the normal bores 216, 218 along the x-axis falls somewhere in between. The pivoting of the collimator 156 about the y-axis causes one half of the collimator 156 to move closer to the light sensitive transducer 158 and the other half moves away from the light sensitive transducer 158 thereby resulting in different shift distances. As a result, $T_y$ can be correlated to a shift in the x coordinates of the light beams, such as by a shift in x1, x3, and/or x4.

When a torque $T_z$ is applied about the z-axis, causing a rotation of the collimator 156 about the z-axis, each of the light beams shift equally clockwise or counterclockwise. As a result, $T_z$ can be correlated to a shift in the slope of a line between any two centroids. Thus, for example, $T_z$ can be correlated to the x, y coordinates of any pair of light beams, including x3, y3 and x4, y4.

Ultimately, the controller 48 is able to compute the three forces $F_x$, $F_y$, $F_z$ and the three torques $T_x$, $T_y$, $T_z$ applied to the force/torque sensor assembly 52 based on these six coordinates associated with displacement of the centroids of the light beams, e.g., x1, y2, x3, y3, x4, y4. Computation of the forces and torques relies upon a multiple linear regression model and prior calibration of the force/torque sensor assembly 52.

Calibration of the force/torque sensor assembly 52 includes applying sets of known forces and torques on the force/torque sensor assembly 52. This includes collecting values for each of the six coordinates x1, y2, x3, y3, x4, y4 for each applied force and torque, which yields a plurality of data sets for each of $F_x$, $F_y$, $F_z$, $T_x$, $T_y$, $T_z$. Data arrays of force/torque outputs can then be created for each axis with the outputs zeroed out in the orthogonal axes to constrain the solution. The multiple linear regression is then computed to solve for the row of A values for the particular axis using a least squares method—for example, $Ax=(X^TX)^{-1}X^TF_x$. This computation is conducted for all three axes for force and torque to yield six values in total. Once the force/torque sensor assembly 52 is calibrated, the following calibration matrix can be used to compute the forces and torques (where o is a small offset term):

$$\begin{bmatrix} F_x \\ F_y \\ F_z \\ \tau_x \\ \tau_y \\ \tau_z \end{bmatrix} = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix} * \begin{bmatrix} x_1 \\ y_2 \\ x_3 \\ y_3 \\ x_4 \\ y_4 \end{bmatrix} + \begin{bmatrix} o_1 \\ o_2 \\ o_3 \\ o_4 \\ o_5 \\ o_6 \end{bmatrix}$$

Thus, controller 48 is able to determine the three forces $F_x$, $F_y$, $F_z$ and the three torques $T_x$, $T_y$, $T_z$ applied to the force/torque sensor assembly 52 using linear algebra and centroid values. These force and torque values are then forwarded to other modules integral with the manipulator controller 48. These other modules employ the force and torque data to regulate the operation of the manipulator 30.

Iv. Multi-Stage Resolution

The force/torque sensor assembly 52 provides two stages of sensitivity in a single transducer, as shown in FIG. 5A. Sensitivity is defined as the resolution of mechanical force/torque data measurements. For example, in one embodiment a first stage captures forces with a minimum and maximum range of zero (0) to five (5) pounds with the maximum upper range being no greater than ten (10) pounds. A second stage captures forces with a minimum and maximum range of five (5) pounds to fifty (50) pounds with the maximum upper range being no greater than one hundred (100) pounds.

Each spring device 102 is dimensioned and configured within the diverter plate 56 to achieve the two levels of sensitivity for determining force and/or torque applied to the instrument 32 thereby providing different resolutions of force/torque measurements.

In one embodiment, when relatively low forces and torques are applied to the force/torque sensor assembly 52, initially, it is the leaf spring components, i.e., the feet 118, that flex in the first stage of spring displacement. Folds 114 are not flexed. The flexures of the leaf springs 106 are linearly proportional to the magnitude of composite forces and torques applied to the force/torque sensor assembly 52 and thus provide the first stage of sensitivity of the force/torque sensor assembly 52, as illustrated in FIG. 5A.

Once the magnitude of the applied forces and torques reach the maximum of the first stage, at least one pair of feet 118 is flexed outwardly to such an extent that the feet 118 abut the adjacent flat 98 so that further flexure is prevented thereby ending the first stage of spring displacement. The application of still larger forces and torques results in the flexure of the serpentine spring 104 in a second stage of spring displacement. It should be appreciated that when this event occurs one or two of the spring torsos 110 expands, i.e., is placed in tension, while the other torso(s) 110 is placed in compression. Owing to the structure of the spring arrangement, these spring expansions and compressions are again linearly proportional to the magnitude of the composite forces and torques applied to the force/torque sensor assembly 52 and thus provide the second stage of sensitivity of the force/torque assembly 52 shown in FIG. 5A.

It should be appreciated that the first and second stages of sensitivity are related to the serpentine springs 104 and leaf springs 106 having different spring rates. In some embodiments, the leaf springs 106 could be configured to provide the second stage of sensitivity while the serpentine springs 104 provide the first stage of sensitivity, i.e., by switching which of the serpentine springs 104 or leaf springs 106 have the larger spring rate. In such an embodiment, when one torso 110 is compressed so that all of the pins 120 are fully pinched between elements of the serpentine spring 104, further flexing of the serpentine spring 104 is stopped thereby ending the first stage of displacement of the serpentine spring 104. Thereafter, the associated leaf spring 106 is compressed in the second stage of displacement until one or more of the tines 78 bottom out in the tine slots 94 to stop any further displacement.

As previously discussed, the manipulator controller 48 utilizes the forces and torques generated by the force/torque sensor assembly 52 to control movement of the actuators 46 and, thus, the instrument 32. These two different resolutions of force/torque measurements could be utilized by the manipulator controller 48 for various purposes.

V. Assembly

Force/torque sensor assembly 52 is first assembled by seating the second of the pins 120 within pin groove 136. The pin housing base 122 is then positioned so that the torso 110 seats in base groove 134. Next, adjacently located pins 120 are seated. Cap 124 is then placed on pin housing base 122 to secure the pins 120 in position. Side walls 130 extend over the ends of the adjacent pins 120 and the sides of the pin housing base 122. This process is repeated until each serpentine spring 104 is fitted with pins 120 secured in position by a pin housing 122. The pins 120 and serpentine springs 104 are sized so that when the serpentine springs 104 are at rest (i.e., before expansion or compression) there exists some spacing in which the serpentine springs 104 can flex before the pins 120 stop further spring actuation.

Once pins 120 are seated within pin housing 122, collimator 156 and light pipe 160 are seated within the inner hub 70 of diverter plate 56. Collimator 156 is first seated on the step 84. Light pipe 160 is next seated within groove 86. Light pipe 160 is seated so that head 166 of light pipe 160 is spaced distally away from collimator 156.

The printed circuit board 184 is seated within circular section 140. The printed circuit board 184 is attached to circular section 140 using fasteners (not shown). Voltage regulator 186, light sensitive transducer 158 and light source 154 are then seated on a distal face of the circular section 140. Voltage regulator 186 and light sensitive transducer 158 are located centrally on the circular section 140. Light sensitive transducer 158 is attached to the distal face of voltage regulator 186. Once these components are secured to the base plate 58, outer hub 72 is fastened and fixed to base plate 58.

Once diverter plate 56 is secured to base plate 58, head plate 54 is attached to inner hub 70. Specifically, threaded fasteners enter through first throughbores 62 and complimentary hub throughbores 80. This completes the assembly of force/torque sensor assembly 52.

As shown in FIG. 3, once force/torque sensor assembly 52 is assembled, the base plate 58 is mounted to the manipulator 30. Mounting plate 60 is then fixed to the head plate 54 and the instrument 32 is mounted onto the instrument mount 36.

VI. Other Embodiments

In some embodiments, the centroid coordinates can be utilized in an alternative manner to compute the forces and torques. The basic principle, however, remains the same, namely that movement of the centroids of the light beams on the light sensitive transducer 158 as loads are applied to the instrument 32 correlate to the six components of force and torque applied to the force/torque sensor assembly 52. One such embodiment is described below.

Figure 17:
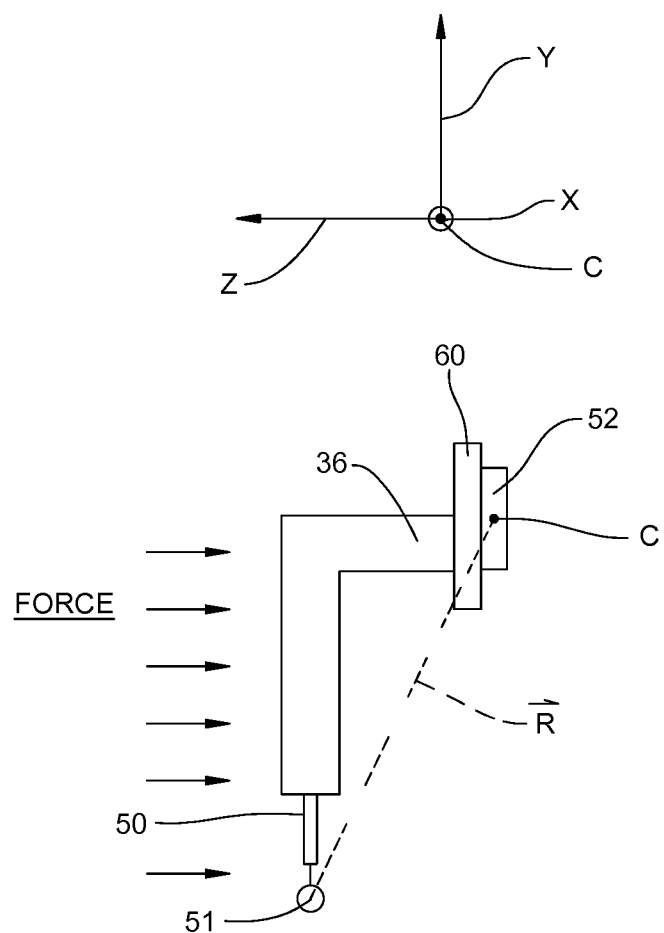
FIG. 17 is a schematic view of the instrument, bur, and force/torque sensor assembly showing a distance R from a centroid of the bur to a center of the force/torque sensor assembly.

Referring to FIG. 17, as part of an initialization of manipulator 30, a memory integral with manipulator controller 48 is provided with data defining a distance R. The distance R is the distance from the center C of the force/torque sensor assembly 52 to the energy applicator 50. More specifically, the distance R is the distance from the center C of the force/torque sensor assembly 52 to the distal end tip of any tool or cutting accessory of the instrument 32. Here, the distal end tip is understood to be a bur of the energy applicator 50. For the bur, the distance R is the distance from the center C of force/torque sensor assembly 52 to the centroid 51 of the bur. Distance R can be determined using a navigation pointer (not illustrated) the position and orientation of which is tracked by the navigation system 220.

Manipulator controller 48 breaks down distance R into its x, y, and z-axis components, respectively, into distances $r_x$, $r_y$ and $r_z$. These distance components are stored in the memory. The above processes can be considered part of the step of providing and storing in the memory the sensor initial state data, step 260 of FIG. 18A.

The locations of the centroids of the light beams emitted through the normal bores 172, 174, 176, 178 when the force/torque sensor assembly 52 is in the unloaded state are represented as points 190, 192, 194, 196, respectively, in FIG. 14A. For reasons of simplicity, the points associated with the light beams that pass through angled bores 180, 182 are not shown in either FIG. 14A or FIG. 14B.

Figure 18A:
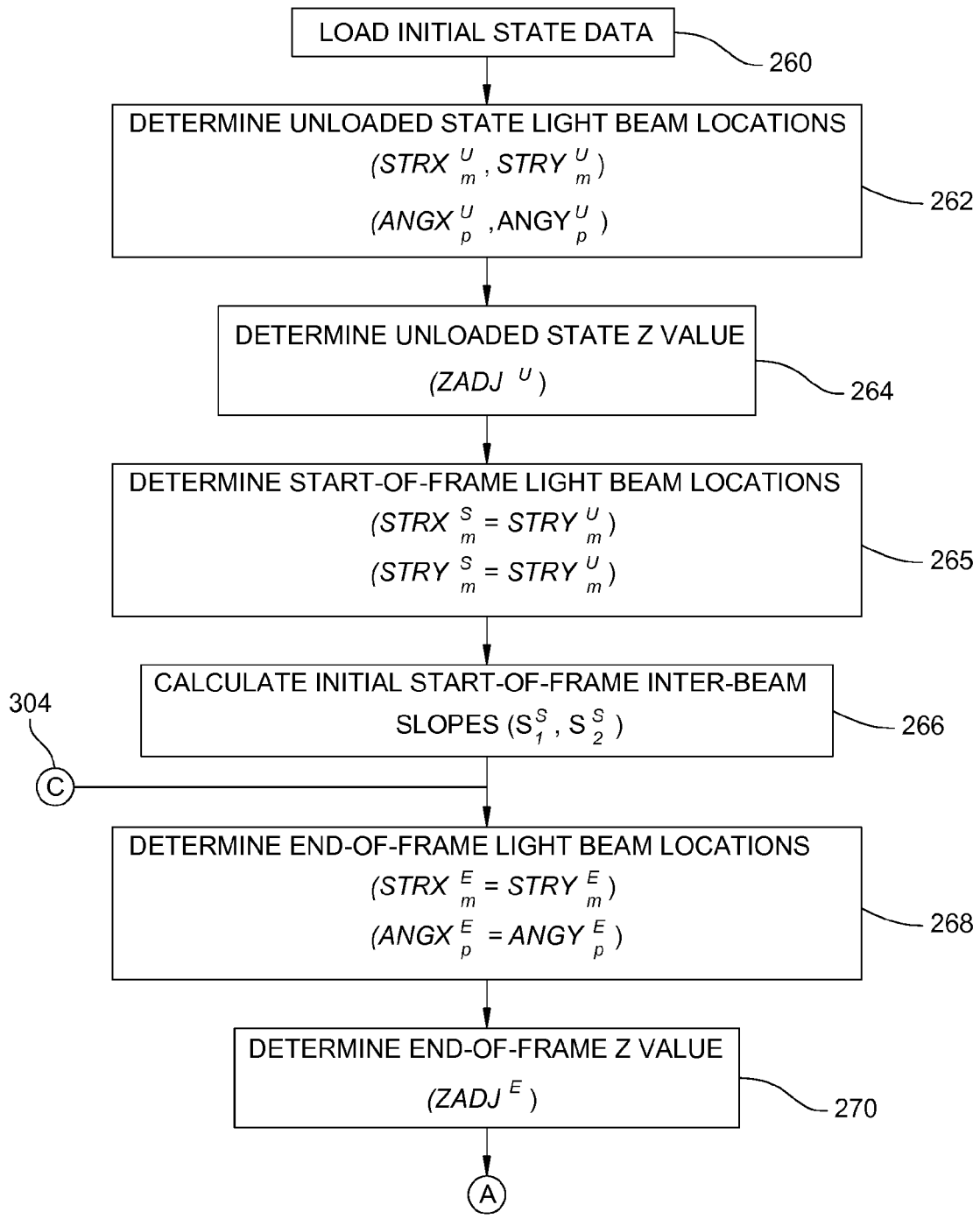
FIGS. 18A-18C are flow diagrams illustrating steps carried out by methods of sensing forces and torques
Figure 18B:
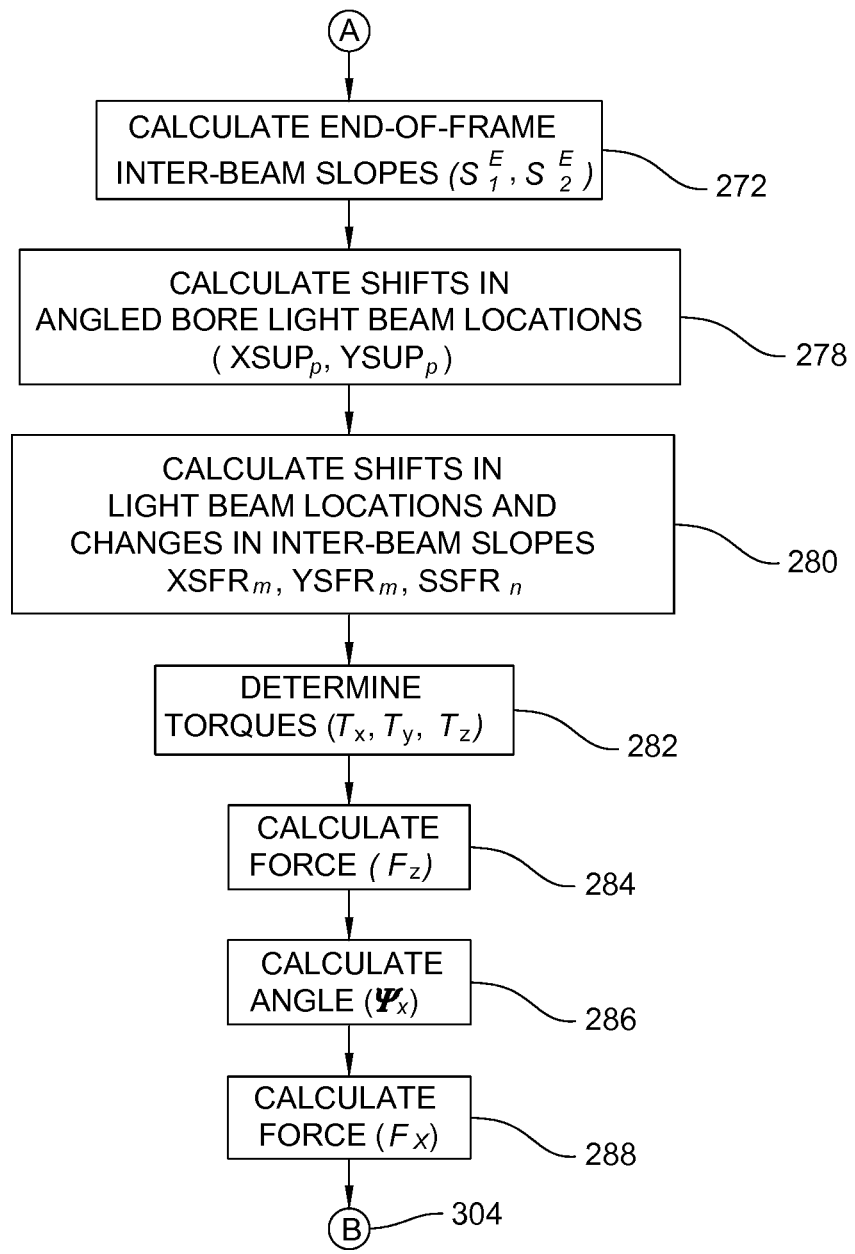
Figure 18C:
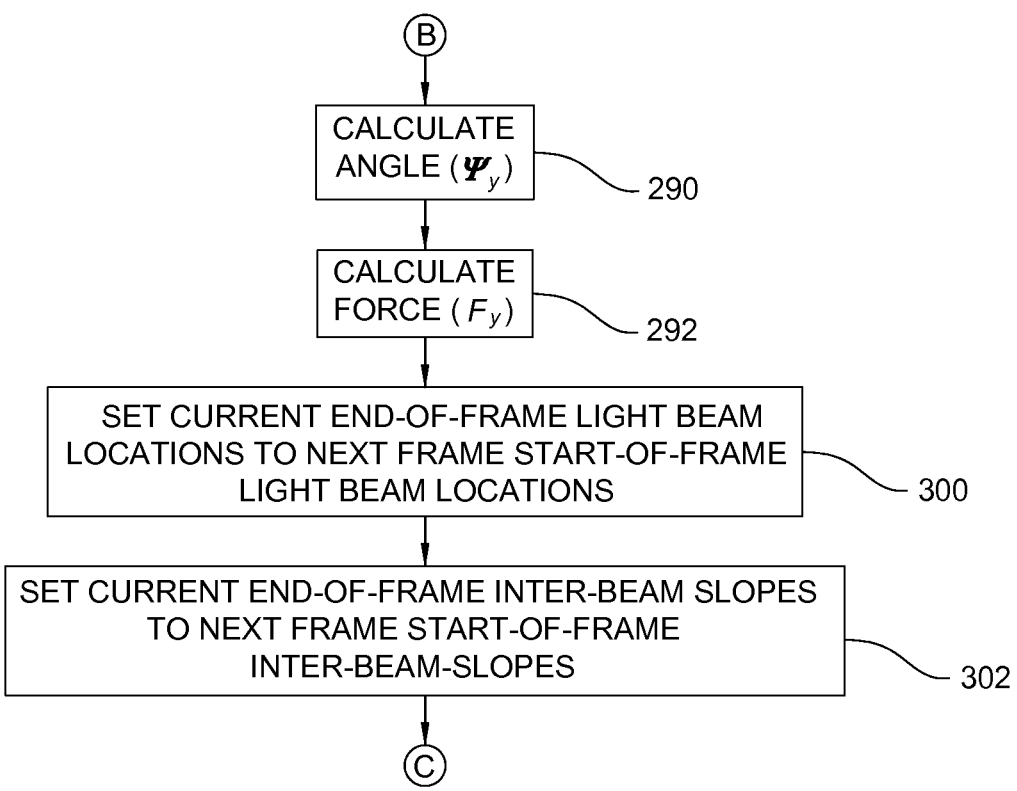
Figure 19:
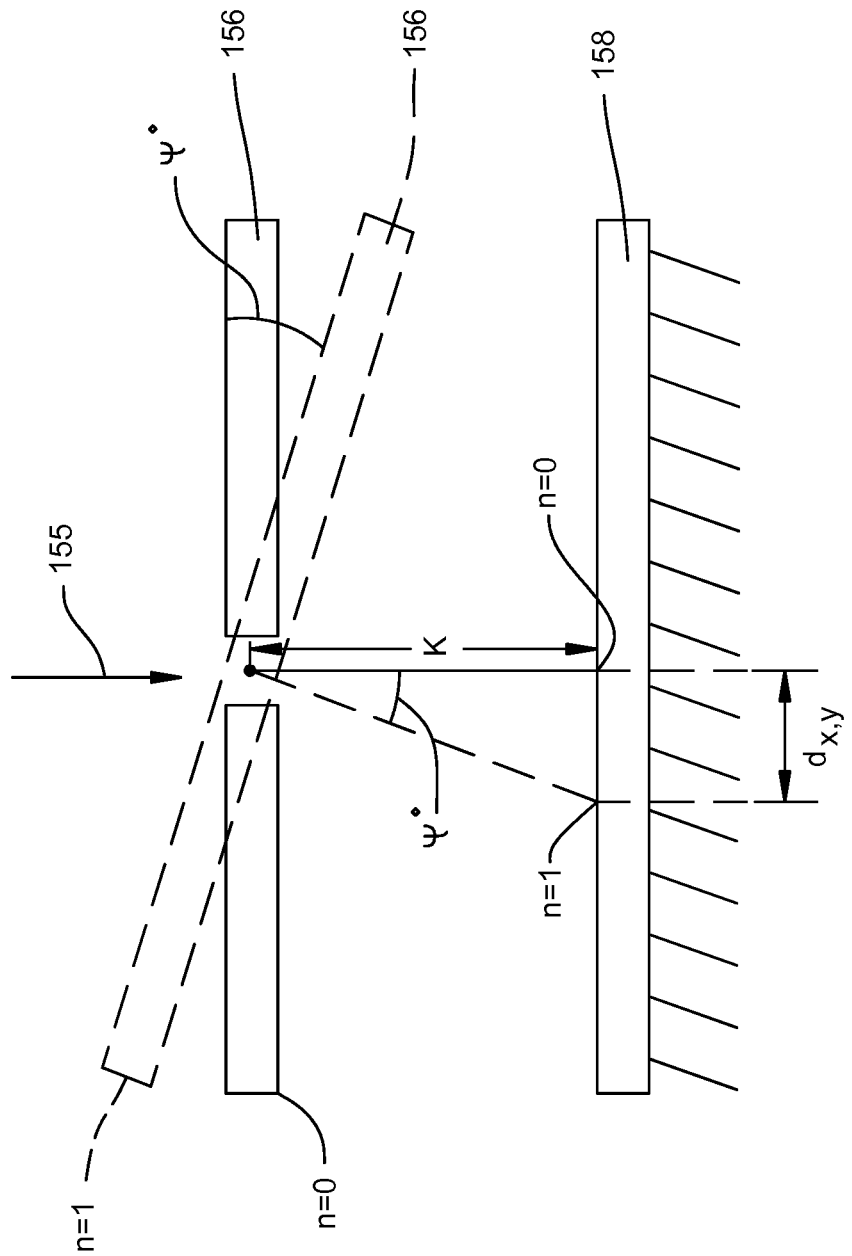
FIG. 19 is a schematic illustration of the collimator and changes in where one light beam strikes the light sensitive transducer between the start of the time frame and the end of the time frame.

In a step 262 of FIG. 18A controller 48 determines the on-sensor unloaded state location of each light beam that extends through the normal bores 172, 174, 176, 178. Each of these locations is defined as a location $(STRX_m^U, STRY_m^U)$. Through this document, superscript "U" represents the unloaded location of the variable. Subscript "m" identifies which one of the four light beams is specified.

Also, in step 262, controller 48 determines the on-sensor location of the light beams that extend through the individual angled bores 180, 182 when the force/torque sensor assembly 52 is in the unloaded state. These locations are the locations of the centroids of the light beams through the angled bores 180, 182, $ANGX_p^U$, $ANGY_p^U$. Subscript "p" identifies which one of the two light beams is specified.

In a step 264 of FIG. 18A, controller 48, calculates the distance between the on-sensor location between the two angled light beams, the distance between the two points $ANGX_p^U$, $ANGY_p^U$. This distance, depicted in FIG. 13A, is referred to as distance $ZADJ^U$.

The controller 48 assigns each light beam an initial start of frame location based on the location of the centroid of each light beam (initial centroid). For each light beam this is location $(STRX_m^S, STRY_m^S)$. Here, superscript "S" represents the start of time frame location. For the first time frame, the start of frame location for each beam is set to the unloaded state on-sensor location of the light beam. In other words:

$$STRX_m^S = STRX_m^U \qquad (1)$$

$$\text{and } STRY_m^S = STRY_m^U \qquad (2)$$

Manipulator controller 48, in a step 266, calculates the slope of the line between the centroid locations of two of the light beams through the normal bores 172, 174, 176, 178. Often, the controller 48 determines the slopes of two lines that extend between centroid locations of the beams. Thus, the controller 48 determines the slope of lines 198 and 200 in FIG. 14A. Line 198 is the line between points 190 and 196, which identify the centroids of light beams through normal bores 172 and 178. Line 200 is the line between points 192 and 194 which identify the centroids of light beams through normal bores 174 and 174. Arbitrarily, slope $S_1^S$ is the angle of the slope of line 198 and slope $S_2^S$ is the angle of the slope of line 200. Slope is defined as the rise/run based on change in x/y from point 190 to point 196 in FIG. 14A.

Based on the signals from light sensitive transducer 158, controller 48 determines the end-of-frame on-sensor locations of the light beams, e.g., final centroid locations, in a step 268. As mentioned above, when the force/torque sensor assembly 52 is in the loaded state, the collimator 156 is in a shifted positioned relative to when in the unloaded state since the shifting of the inner hub 70 results of a like shifting of the position of the collimator 156. This means the light beams that pass through the collimator 156 strike different locations on the light sensitive transducer 158 than when the force/torque sensor assembly 52 is in the unloaded state.

In FIG. 14B, point 202 represents the shift of a centroid of a first beam from point 190. Point 204 represents the shift of a centroid of a second beam from the location of point 192. Point 206 represents the shift of a centroid of a third beam from the location of point 194. Point 208 represents the shift of a centroid of a fourth beam from the location of point 196.

Step 268 is performed using the same processes that are employed to perform step 262. Therefore, as a consequence of the execution of step 268, controller 48 has location data $(STRX_m^E, STRY_m^E)$ for each of the four light beams associated with the normal bores 172, 174, 176, 178. In this document, superscript "E" indicates an end-of-frame location data or variable associated with the light beam or beams.

As a consequence of the collimator 156 shifting position, the on-sensor locations of the light beams that extends through the angled bores 180, 182 also shift position. The change in these positions is represented by the differences between FIGS. 13A and 13B. Therefore, as part of step 268, based on the end-of-frame signals from the light sensitive transducer 158, controller 48 determines the end-of-frame on-sensor location of the light beams that extend through each of the angled bores 180, 182. Each of these centroid locations is a point $(ANGX_p^E, ANGY_p^E)$.

In a step 270, controller 48 determines the value of distance $ZADJ^E$ in the now loaded state. Step 270 is performed using the same processes that are employed to perform step 264. As shown in FIG. 13B, distance $ZADJ^E$ is the distance between the on-sensor locations of the light beams that extend through angled bores 180, 182. In contrast to distance $ZADJ^U$, which is a constant, the value of distance $ZADJ^E$ is variable throughout the operation of force/torque sensor assembly 52.

In a step 272, controller 48 then calculates new slopes of the lines. With reference to FIG. 14B, this means the slope of line 210, the shifted orientation of line 198 and the slope of line 212, the shifted orientation of line 200 are calculated. Arbitrarily, slope $S_1^E$ is the angle of the slope of line 210; slope $S_2^E$ is the angle of the slope of line 212.

In a step 278, manipulator controller 48 calculates the differences in on-sensor locations of the light beams through one of the angled bores 180, 182. These differences, $XSUP_p$ and $YSUP_p$, for the light beam, are the shifts along the x and y axes, of the location of the centroid of the light beam through the one of the angled bore 180, 182 on light sensitive transducer 158 between the unloaded state position of the light beam and the end-of-frame position. Differences $XSUP_p$ and $YSUP_p$ are calculated according to the following formulas:

$$XSUP_p = ANGX_p^U - ANGX_p^E \quad (3)$$

$$YSUP_p = ANGY_p^U - ANGY_p^E \quad (4)$$

In a step 280, manipulator controller 48 calculates a second set of differences representative in the shifts of the light beams that extend through normal bores 172, 174, 176, 178. These are differences in positions of the light beams (i.e., positions of centroids) between the start and end of the frame on-sensor beam locations. These differences are XSFR for the frame position shift along the x-axis and YSFR for the frame position shift along the y-axis. These differences are calculated according to the formulas:

$$XSFR_m = STRX_m^S - STRX_m^E \quad (5)$$

$$YSFR_m = STRY_m^S - STRY_m^E \quad (6)$$

Again, for the first frame of sensor operation, the unloaded state on-sensor locations ($STRX_m^U$, $STRY_m^U$) are employed as the minuends in Equations (5) and (6), respectively.

A further part of the shifted position calculations of step 280 is the calculation of the change in slope of at least one of the lines that extends between the on-sensor locations of light beams through the two of the normal bores 172, 174, 176, 178. This shift, SSFR, is unit less and is calculated according to the formula:

$$SSFR_n = S_n^S - S_n^E \quad (7)$$

Subscript "n" identifies which of the two lines the shift in angle is associated. As shown in FIGS. 14A and 14B, the slopes of lines 198 and 200 have shifted to the slopes of lines 210 and 212, respectively.

Angle delta theta ($\Delta\theta$) is the measured angle shift between the slope of at least one of the lines measured from the initial frame and the end frame. Angle delta theta is measured in degrees.

$$\Delta\theta = \tan^{-1}(SSFR_n) \quad (8)$$

Controller 48 calculates location differences $XSUP_p$, $YSUP_p$, for the position shifts of the centroids of the light beams through the angled bores 180, 182. Location differences $XSFR_m$ and $YSFR_m$ are calculated for the shifts in position of the centroids of the light beams through the normal bores 172, 174, 176, 178. Also changes in slope $SSFR_n$ is calculated. In one construction of the force/torque sensor assembly 52, four light beams pass through the collimator 156 to the light sensitive transducer 158. Specifically, these four light beams are beams defined by both angled bores 180, 182 and one pair of either set of opposed bores 172 and 178, or 174 and 176.

Manipulator controller 48, based on the above differences in beam locations, inter-beam location distance ZADJ, and shifts in slope between the beam locations determines the forces and torques that are applied to the force/torque sensor assembly 52.

In one embodiment, as illustrated in step 282, based on differences $XSFR_m$ and $YSFR_m$ and the angle difference $SSFR_n$, the controller first determines torques $T_x$, $T_y$ and $T_z$ that are applied to the force/torque sensor assembly 52. These three differences are a function of the torques applied to the force/torque sensor assembly 52. More specifically, as previously described, it has been shown that $T_x$ correlates to a shift in the centroids of the light beams along the y-axis and those shifts are indicated by $YSFR_m$. $T_y$ correlates to a shift in the centroids of the light beams along the x-axis and those shifts are indicated by $XSFR_m$. $T_z$ correlates to angle difference $SSFR_n$.

Controller 48 executes step 282 by applying the set of these differences as input values into a torque look-up table to which the controller has access. Each set of these three differences corresponds to a set of torques $T_x$, $T_y$ and $T_z$ stored in the table. The torques may also be determined using the linear algebra methods described above based on a multiple linear regression model. The torques from the look-up table or multiple linear regression model are then used to calculate the forces applied to the instrument 32. More specifically, the forces applied to the instrument 32 that yield these torques are determined based on the well known relationship $T=F*r*\sin\theta$. These forces can then be translated to the coordinate system of the force/torque sensor assembly 52 since the instrument 32 is considered to be part of the same rigid body as the inner hub 70 of the force/torque sensor assembly 52. The relationship between the forces and torques is such that when forces are applied along the x, y, or z axes, a torque is always generated at the force/torque sensor assembly 52 given the configuration of the instrument 32 and its spatial relationship to the force/torque sensor assembly 52. Sample calculations for the forces in one embodiment are shown below.

In a step 284 controller 48 first calculates the force $F_Z$. Force $F_Z$ is determined as a function of torque $T_Z$, the position of the instrument 32 relative to the force/torque sensor assembly 52, and Delta angle theta:

$$F_z = \frac{T_z}{r_z \sin(\Delta\theta)} \quad (9)$$

Here, distance $r_z$ is the z-axis component of vector $\vec{R}$. Delta angle theta ($\Delta\theta$) is the measured angle shift between at least one of the measured lines, as previously described. Delta angle theta is determined using Equation (8).

In a step 288, the force $F_x$ is calculated. This force is determined by initially calculating an angle $\Psi_x$, an x-axis collimator deflection angle. Deflection angle $\Psi_x$ is the angular rotation about the x-axis of the collimator 156 from when the force/torque sensor assembly 52 is in the unloaded state to the end-of-frame state. This is the rotation of the x-axis in the y-z plane. In a step 286, deflection angle $\Psi_x$ is determined according to the formula:

$$\Psi_x = \tan^{-1} \frac{ZADJ_m^U + \left[\frac{ZADJ_m^U - ZADJ_m^E}{2}\right]}{XSUPp} \quad (10)$$

Owing to the shift of the collimator 156 along substantially the z-axis, $ZADJ^E$ is a variable that is measured after every frame of force/torque sensor assembly 52 operation. Once deflection angle $\Psi_x$ is calculated, force $F_x$ is determined in step 288 according to the following formula:

$$F_x = \frac{T_x}{r_x \sin(\Psi_x)} \quad (11)$$

In a step 292 the force $F_y$ is calculated. This force is determined by initially determining deflection angle $\Psi_y$, a y-axis collimator deflection angle. Deflection angle $\Psi_y$ is the angular rotation about the y-axis of the collimator 156 from when the force/torque sensor assembly 52 is in the unloaded state to the end-of-frame state. This is the rotation of the y-axis in the x-z plane. In a step 290, deflection angle $\Psi_y$ is determined according to the formula:

$$\Psi_y = \tan^{-1} \frac{ZADJ_m^U + \left[\frac{ZADJ_m^U - ZADJ_m^E}{2}\right]}{YSUPp} \quad (12)$$

$ZADJ^E$ is the same value determined by controller 124 in step 286. Here, $YSUP_p$ is the shift along the y-axis of the location of a light beam through a single angled bore 180, 182 on light sensitive transducer 158 between the unloaded position and end-of-frame position. Once $\Psi_y$ is calculated, force $F_y$ is determined according to the following formula:

$$F_y = \frac{T_y}{r_y \sin(\Psi_y)} \quad (13)$$

Thus, upon execution of step 292, controller 124 has determined six variables, the three torques $T_x$, $T_y$ and $T_z$, and the three forces $F_x$, $F_y$ and $F_z$, applied to the force/torque sensor assembly 52. The force and torque data are then forwarded to other modules integral with the manipulator controller 48, step not shown. These other modules employ the force and torque data to regulate the operation of the manipulator 30.

In a step 300, controller 48 then defines the start-of-frame light beam locations for the next time frame. These are the start of frame locations XSUP, YSUP for the light beams through two of the normal bores 172, 174, 176, 178. In step 300, end-of-frame on-sensor light beam locations (STRX, STRY) of each normal bore light beam for the current frame become the new start-of-frame locations (STRX, STRY) for the next frame.

In a step 302, end-of-frame inter-beam slopes are set to define a next frame start-of-frame inter-beam slope. Controller 48 then proceeds to reexecute step 268, to determine the end-of-frame light beam locations for the next frame, now the current frame. Once step 268 is reexecuted the steps following step 268 are also reexecuted. Controller 48 thus continually outputs the data describing in essentially real time the forces and torques that are applied to the force/torque sensor assembly.

In some embodiments, the locations of the light beams for the normal bores 172, 174, 176, 178 and angled bores 180, 182 in the loaded state, for each frame, are compared to their locations in the unloaded state to determine forces and torques, as opposed to being compared to their locations at the end of the last time frame. Thus, the start-of-frame locations of the light beams for each computation are the locations of the light beams in the unloaded state with all determinations of forces and torques during operation being considered from the unloaded state to determine total forces and torques applied relative to the unloaded state as opposed to measuring incremental forces and torques applied in each time frame.

In other embodiments, a torque sensor assembly is provided where, based on differences $XSFR_m$ and $YSFR_m$ and the angle difference $SSFR_n$, the controller only determines torques $T_x$, $T_y$ and $T_z$ that are applied to the torque sensor assembly wherein the torque sensor assembly has the same features as the force/torque sensor assembly 52 with the only difference being that only torques are measured.

Figure 21:
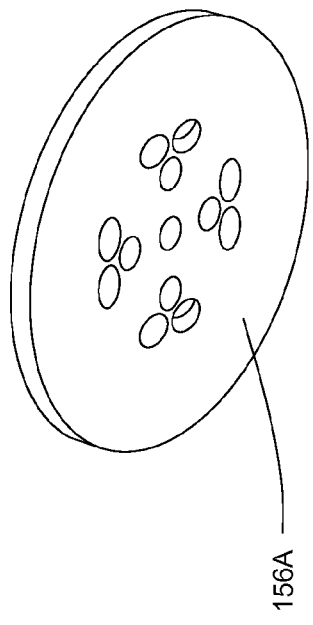
FIG. 21 is a perspective view of the alternative collimator of FIG. 20.
Figure 20:
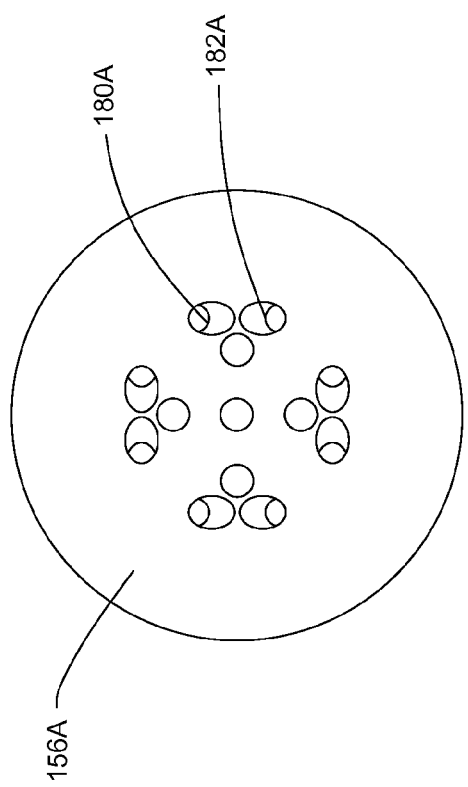
FIG. 20 is a plan view of an alternative collimator.

FIGS. 20 and 21 depict an alternative collimator 156A with multiple sets of angled bores 180A, 182A.

Figure 22:
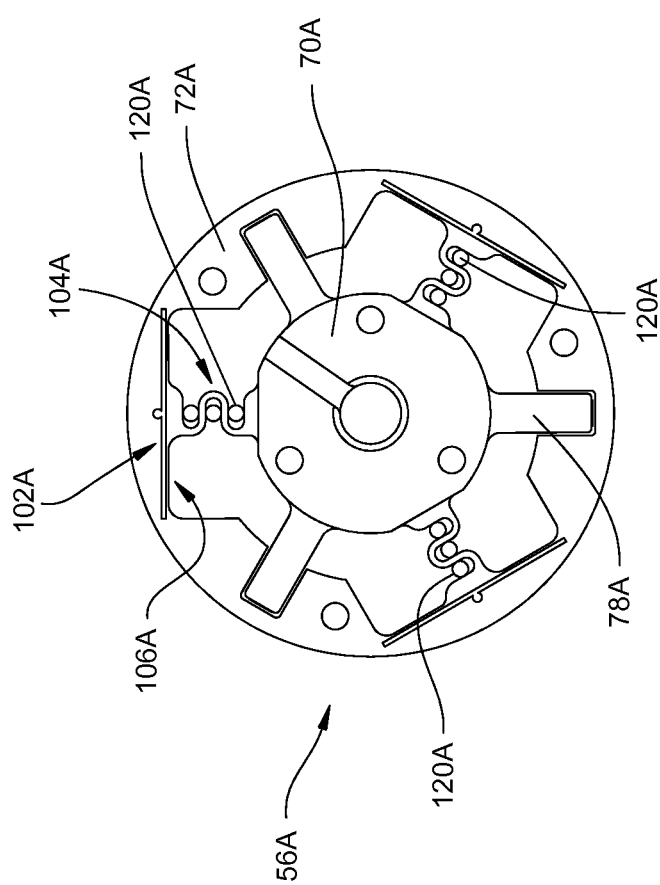
FIG. 22 is a plan view of an alternative embodiment of the diverter plate in which pins are vertically seated within serpentine springs.
Figure 23:
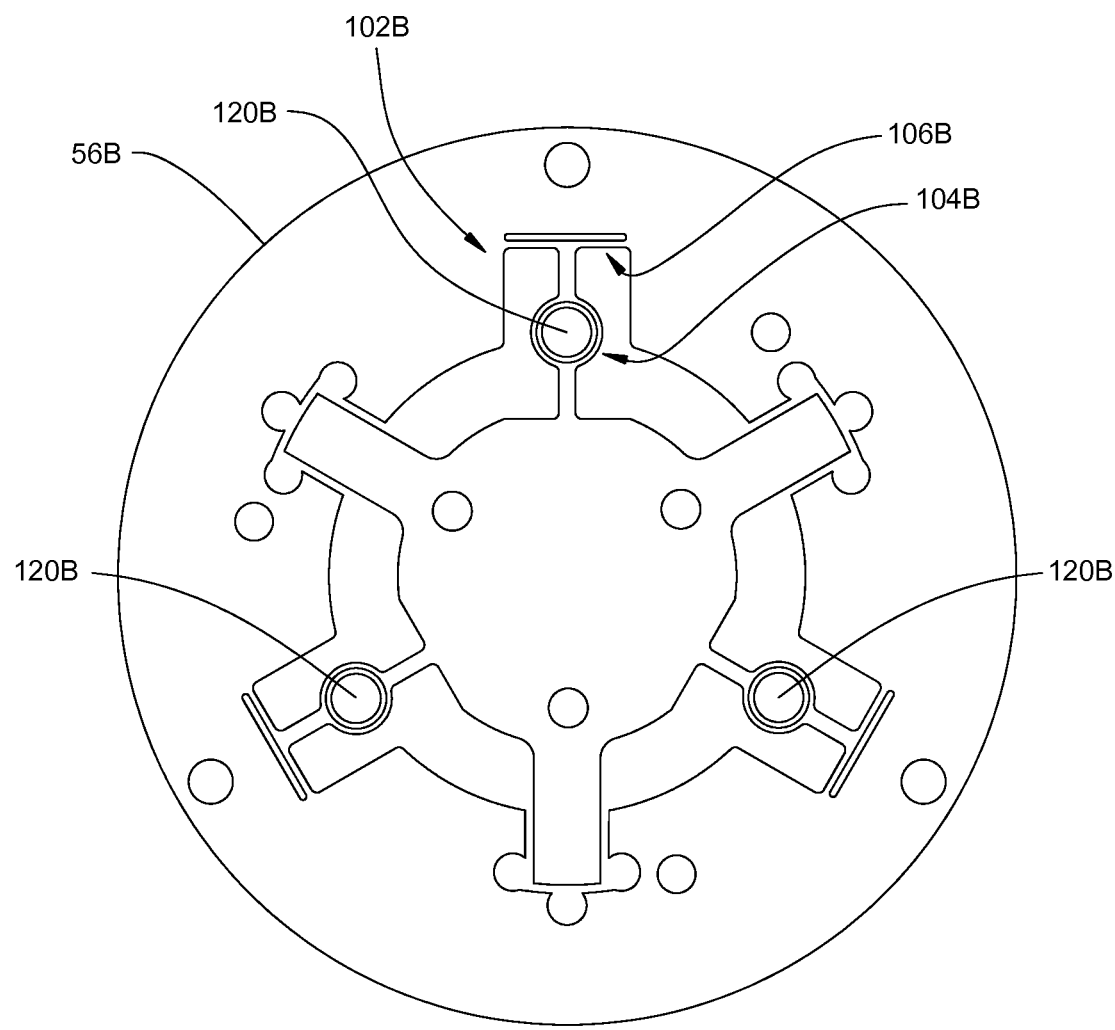
FIG. 23 is a plan view of a second alternative embodiment of the diverter plate.
Figure 24:
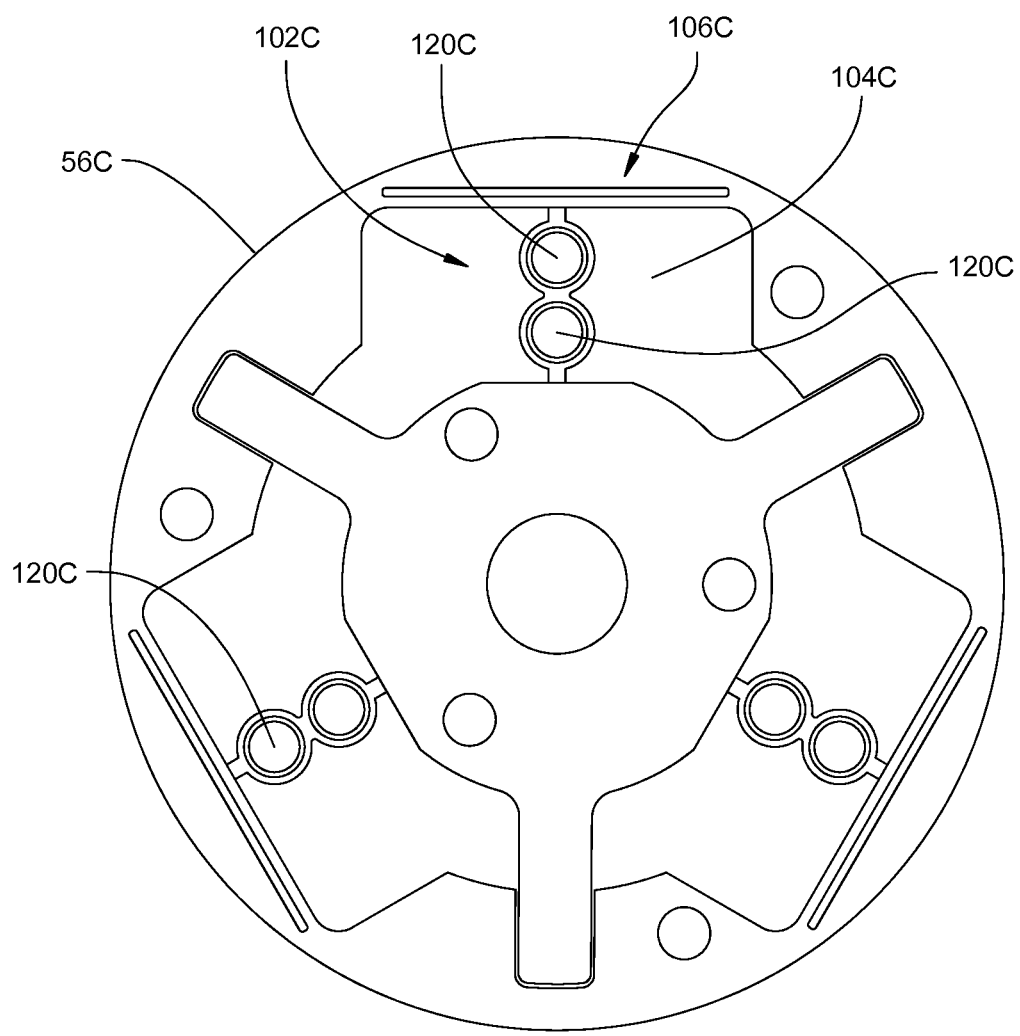
FIG. 24 is a plan view of a third alternative embodiment of the diverter plate.

FIGS. 22-24 depict alternative embodiments of the diverter plate 56. These alternative diverter plates are substantially the same as diverter plate 56, but with different spring arrangements. For example, in FIG. 22, the serpentine springs 104A have been rotated ninety degrees. As a result, the inner hub 70A is movably coupled to the outer hub 72A by three spring devices 102A including three serpentine springs 104A and three leaf springs 106A. Pins 120A are also positioned to act as stops for the serpentine springs 104A.

In FIG. 23, three spring devices 120B are shown that include leaf springs 106B similar to the leaf springs 106, but the serpentine springs 104 have been replaced with cylindrical hollow resilient members surrounding elongated pins 120B that act as stops for the cylindrical hollow resilient members. In this embodiment, the first stage of spring displacement is to compress the cylindrical hollow resilient member against the pin 120B. This stops the first stage and then the second stage continues by flexing the leaf spring 106C. Thus, the leaf spring 106C is configured to have a spring rate that prevents substantially flexing until the first stage is complete.

In FIG. 24, three spring devices 120C are shown that include leaf springs 106C similar to the leaf springs 106, but the serpentine springs 104 have been replaced with two cylindrical hollow resilient members arranged in series. Elongated pins 120C act as stops for these cylindrical hollow resilient members.

In some embodiments, structural members other than the disclosed diverter plate may serve as the transducer that, in response to the application of force and torque, selectively direct the light emitted towards the light sensitive transducer 158. In other words, structural sensor members other than the inner hub 70 may move relative to the base plate 58 to selectively direct the light emitted towards the light sensitive transducer 158.

The tines 78 may number less than three or more than three. In other versions, tines 78 may be dimensioned to inhibit unnecessary flexure of the inner hub 70 within the force/torque sensor assembly 52.

In some embodiments, the force/torque sensor assembly 52 is part of the manipulator 30. In other embodiments, the force/torque sensor assembly 52 is a separate assembly acting between the manipulator 30 and the instrument 32.

In some embodiments, the outer hub 72 is fixed directly to the distal end component 138 of the linkage assembly 40 and acts as the base plate for the force/torque sensor assembly. In this embodiment, the light sensitive transducer 158 may be recessed in a pocket in the distal end component 138 of the linkage assembly 40.

In some embodiments, collimator is square in shape. In these embodiments, inner hub bore 80 is configured to be square in shape so that a square-shaped collimator may seat within inner hub.

In some embodiments, the abutment of folds 114 against the pins 120 prevents plastic deformation of the pleats 116. Consequently when forces and/or torques are removed and then new forces and/or torques applied, the serpentine springs 104 will again undergo expansion or compression that is linearly related to the magnitude of the applied forces and torques in the first or second stage of spring displacement.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A sensor assembly comprising:
    a base plate;
    a sensor member displaceable relative to said base plate;
    a spring arrangement having first and second stages reactive to displacement of said sensor member relative to said base plate with different resolutions of force and torque measurements being associated with said first and second stages, wherein said spring arrangement is configured to transition to said second stage after said first stage; and
    a light sensitive transducer for sensing displacement of said sensor member relative to said base plate and for generating corresponding output signals.

2. The sensor assembly of claim 1 wherein said spring arrangement includes:
    a plurality of first springs reactive to displacement of said sensor member relative to said base plate, each of said first springs being displaceable in said first stage and having a first spring rate; and
    a plurality of second springs reactive to displacement of said sensor member relative to said base plate, each of said second springs being displaceable in said second stage and having a second spring rate different than said first spring rate.

3. The sensor assembly of claim 2 wherein said first springs are leaf springs.

4. The sensor assembly of claim 3 wherein said second springs are serpentine springs.

5. The sensor assembly of claim 4 wherein each of said serpentine springs has a first end connected to said sensor member and a second end connected to one of said leaf springs.

6. The sensor assembly of claim 4 wherein each of said serpentine springs includes a head, a torso, and a leg.

7. The sensor assembly of claim 6 wherein said torso includes a U-shaped fold.

8. The sensor assembly of claim 7 wherein each of said leaf springs has feet extending in opposing directions from one of said legs of said serpentine springs.

9. The sensor assembly of claim 7 including a plurality of pins for interacting with said serpentine springs.

10. The sensor assembly of claim 9 wherein said plurality of pins includes a first pin positioned between said head and said torso, a second pin positioned in said U-shaped fold, and a third pin positioned between said torso and said leg.

11. The sensor assembly of claim 10 including a pin housing securing said first, second, and third pins in position.

12. The sensor assembly of claim 11 wherein said pin housing includes a pin housing base and a cover disposed over said pin housing base, said first, second, and third pins secured between said cover and said pin housing base.

13. The sensor assembly of claim 1 including an outer hub fixed to said base plate.

14. The sensor assembly of claim 13 wherein said sensor member is further defined as an inner hub, said spring arrangement acting between said inner hub and said outer hub.

15. The sensor assembly of claim 14 including a head plate fixed to said inner hub, said head plate configured to be coupled to an instrument and said base plate configured to be coupled to a linkage assembly.

16. The sensor assembly of claim 14 including a plurality of tines extending radially outwardly from said inner hub.

17. The sensor assembly of claim 16 wherein said outer hub defines a plurality of slots for receiving said tines wherein each of said slots are dimensioned to allow movement of said tines in said slots.

18. The sensor assembly of claim 1 including a light source and a collimator for directing light from said light source onto said light sensitive transducer.

19. The sensor assembly of claim 1 including a stop configured to interact with said spring arrangement to transition said spring arrangement from said first stage to said second stage.

* * * * *